(12) United States Patent
Koide et al.

(10) Patent No.: US 7,187,657 B2
(45) Date of Patent: Mar. 6, 2007

(54) COMMUNICATION TERMINAL AND METHOD USED THEREIN

(75) Inventors: Youhei Koide, Neyagawa (JP); Tohru Yasukawa, Ito-gun (JP); Shigeo Yoshida, Takatsuki (JP); Shinichiro Ohmi, Toyono-gun (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 285 days.

(21) Appl. No.: 10/959,094

(22) Filed: Oct. 7, 2004

(65) Prior Publication Data
US 2005/0078674 A1  Apr. 14, 2005

(30) Foreign Application Priority Data
Oct. 9, 2003 (JP) ............................. 2003-351212
Jul. 29, 2004 (JP) ............................. 2004-222462

(51) Int. Cl.
H04L 12/26 (2006.01)
H04L 12/56 (2006.01)
H04L 1/18 (2006.01)
H03M 13/00 (2006.01)

(52) U.S. Cl. .................. 370/252; 370/389; 714/749; 714/776

(58) Field of Classification Search ................ 370/252, 370/389; 714/749, 776
See application file for complete search history.

(56) References Cited

U.S. PATENT DOCUMENTS

| | | | | |
|---|---|---|---|---|
| 6,157,616 A | * | 12/2000 | Whitehead | 370/252 |
| 6,603,980 B1 | * | 8/2003 | Kitagawa et al. | 455/522 |
| 6,738,646 B2 | * | 5/2004 | Miyoshi et al. | 455/561 |
| 6,859,656 B2 | * | 2/2005 | Choi et al. | 455/522 |
| 7,133,462 B2 | * | 11/2006 | Ha et al. | 375/295 |
| 2003/0053419 A1 | | 3/2003 | Kanazawa et al. | |
| 2003/0087644 A1 | * | 5/2003 | Miyoshi et al. | 455/452 |
| 2003/0100267 A1 | * | 5/2003 | Itoh et al. | 455/69 |
| 2005/0031019 A1 | * | 2/2005 | Itoh | 375/142 |
| 2005/0226182 A1 | * | 10/2005 | Itoh | 370/329 |

FOREIGN PATENT DOCUMENTS

| | | |
|---|---|---|
| EP | 1 128 573 | 8/2001 |
| JP | 9-219697 | 8/1997 |
| JP | 2000-184061 | 6/2000 |
| JP | 2002-158675 | 5/2002 |
| JP | 2003-209537 | 7/2003 |

* cited by examiner

Primary Examiner—Alpus H. Hsu
(74) Attorney, Agent, or Firm—Wenderoth, Lind & Ponack, L.L.P.

(57) ABSTRACT

A communication terminal which modulates and demodulates a packet for transmission and reception based on a communication parameter for modulation and demodulation determined according to a communication-medium characteristic. The communication terminal includes: an extracting unit which extracts, during every occurrence of a predetermined cycle, information indicative of either one of transmission efficiency and reception quality of the packet as an information element; a calculating unit which calculates a difference between a first information element extracted by the extracting unit and a second information element previously extracted by the extracting unit; and detecting-scheme performance determining unit which determines, based on the difference between the first information element and the second information element whether a scheme of detecting the communication-medium characteristic is to be performed.

20 Claims, 14 Drawing Sheets

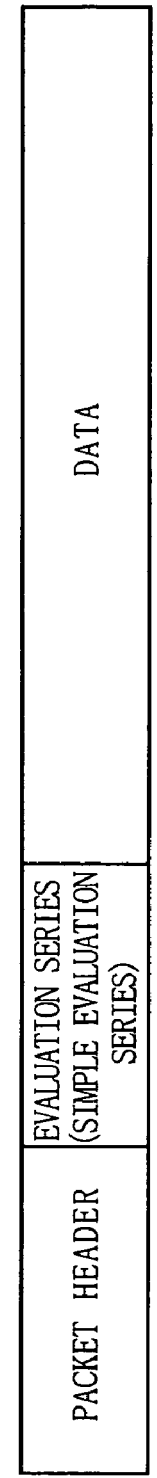
FIG. 9A
FIG. 9B

COMMUNICATION TERMINAL AND METHOD USED THEREIN

BACKGROUND OF THE INVENTION

1. Field of the Invention

The present invention relates to communication terminals and methods for modulating and demodulating data for transmission/reception and, more particularly, to a communication terminal and a method for detecting a characteristic of a communication medium, changing a communication parameter for modulation/demodulation so as to cause the communication parameter to follow the state of the communication medium, and transmitting/receiving modulated/demodulated data based on the communication parameter.

2. Description of the Background Art

In general, in the case of a system where the characteristic of a communication medium is fluctuated with time (for example, a wireless communication system where multipath fading occurs or a power-line communication system influenced by group delay), the communication-medium characteristic is significantly fluctuated depending on a positional relation between a transmission terminal and a reception terminal. Therefore, in a communication system using a multi-carrier transmission scheme in which a communication parameter, such as a sub-carrier for use and a modulation scheme, is selected for communication depending on the communication-medium characteristic, the communication-medium characteristic is detected between the transmission terminal and the reception terminal for selecting a communication parameter. In this specification, a series of processes of detecting a communication-medium characteristic and selecting a communication parameter is hereinafter referred to as a communication-medium-characteristic detecting scheme. In this communication-medium-characteristic detecting scheme, the quality of a communication medium on each sub-carrier is evaluated. Therefore, the communication-medium-characteristic detecting scheme is also referred to channel estimation. Particularly, in a communication system using a multi-carrier transmission scheme, when the communication parameter is changed for each sub-carrier depending on the state of the communication medium for each sub-carrier, a deteriorated sub-carrier may be controlled so as not to be used for the purpose of preventing data from being transmitted on that deteriorated sub-carrier (for example, in Discrete MultiTone (DMT) scheme). In such a communication scheme, a special evaluation-series packet using all sub-carrier is employed for communication-medium estimation, thereby estimating all sub-carriers and performing the communication-medium-characteristic detecting scheme (channel estimation) (for example, Japanese Patent Laid-Open No. 2002-158675).

Such a conventional method of executing the communication-medium-characteristic detecting scheme significantly depends on a characteristic unique to the communication medium (for example, Japanese Patent Laid-Open No. 2000-184061).

In a known scheme for making the method as less depend on the characteristic unique to the communication medium as possible, the communication-medium-characteristic detecting scheme is performed in predetermined cycles or upon estimation that the communication-medium characteristic is deteriorated when the number of packet retransmissions exceeds a predetermined number (for example, Japanese Patent Laid-Open Publication No. 2002-158675).

In another scheme, a transmission speed, an error rate, and a reception signal intensity are measured for determining a transmission scheme (for example, Japanese Patent Laid-Open No. 2003-209537).

FIG. 12 is a sequence diagram showing a conventional scheme for determining a timing of performing the communication-medium-characteristic detecting scheme independently of the characteristic unique to the communication medium. In FIG. 12, a transmission terminal 9000 transmits an evaluation-series packet 9001 for detecting a communication-medium characteristic to a reception terminal 9100 in order to determine a communication parameter for defining a scheme of modulating data to be transmitted to the reception terminal 9100. The reception terminal 9100 uses the evaluation-series packet 9001 from the transmission terminal 9000 to detect a communication-medium characteristic for each sub-carrier, and then transmits an evaluation-result packet 9002 containing information regarding the detected communication-medium characteristic to the transmission terminal 9000. Based on the evaluation-result packet 9002, the transmission terminal 9000 ascertains the communication quality for each sub-carrier, and determines a communication parameter for each sub-carrier. The transmission terminal 9000 then uses the determined communication parameter to modulate data, and then transmits a data sequence 9003 including a plurality of packets to the reception terminal 9100. As illustrated in FIG. 12, it is assumed herein that packet losses occur when the data sequence 9003 is transmitted. When such packet losses occur, the transmission terminal 9000 retransmits the lost packets. Unless the number of retransmissions exceeds a predetermined value, the transmission terminal 9000 transmits the data sequence without performing a communication-medium-characteristic detecting scheme until the next cycle of performing the communication-medium-characteristic detecting scheme. When the next cycle of performing the communication-medium-characteristic detecting scheme arrives, the transmission terminal 9000 transmits an evaluation-series packet 9004. Then, as described above, the transmission terminal 9000 uses an evaluation-result packet 9005 from the reception terminal 9100 to determine a communication parameter for each sub-carrier for modulation based on the communication parameter, and then transmits a data sequence 9006.

As illustrated in FIG. 12, it is assumed herein that packet losses occur when the data sequence 9006 is transmitted. When such packet losses occur, the transmission terminal 9000 retransmits lost packets. When the number of retransmissions exceeds the predetermined number, the transmission terminal 9000 determines that the state of the communication medium is deteriorated, and then transmits an evaluation-series packet 9007 for detecting the communication-medium characteristic. The reception terminal returns an evaluation-result packet 9008 to the transmission terminal 9000. Based on the evaluation-result packet 9008, the transmission terminal 9000 determines a communication parameter for modulation based on the communication parameter and transmission of the following packets.

As such, in the conventional communication systems, the communication-medium-characteristic detecting scheme is performed cyclically or when the number of retransmissions of the packets exceeds the predetermined number, thereby determining a communication parameter so as to follow the current state of the communication medium.

FIG. 13 is a graph showing a relation between a communication rate and a state of the communication medium in a conventional case where the communication-medium-characteristic detecting scheme is cyclically performed. Here, the communication rate is a communication speed calculated by the set communication parameter.

In FIG. 13, times T1011 and T1012 represent times of starting the communication-medium-characteristic detecting scheme. As illustrated in FIG. 13, in the method of cyclically performing the communication-medium-characteristic detecting scheme, the communication parameter determined at the previous time T1011 is used during a period until the next time T1012 arrives even if the state of the communication medium is fluctuated. During this period, a sub-carrier or a modulating scheme adapted to fluctuations in the state of the communication medium cannot be used. Therefore, packets transmitted from the transmission terminal cannot normally arrive at the reception terminal, thereby disadvantageously decreasing a throughput. For example, in a section P1 illustrated in FIG. 13, communication is tried at a high communication rate even through the state of the communication medium is deteriorated, thereby increasing losses of the packets to be transmitted and decreasing the throughput. Also, there is another problem in which a period from the time when the state of the communication medium is fluctuated to the time when the communication parameter is changed is long.

One way of solving these problems is to shorten the cycle of performing the communication-medium-characteristic detecting scheme so as to follow fluctuations of the state of the communication medium. In the communication-medium-characteristic detecting scheme, the reception terminal evaluates a reception CINR (Carrier to Interference and Noise power Ratio) for each sub-carrier. In order to improve the accuracy in CINR evaluation, the transmission terminal transmits an evaluation-series packet having a long data length (the number of symbols). Therefore, as the number of time of performing the communication-medium-characteristic detecting scheme is increased, the temporal proportion of the evaluation-series packet is increased in the communication system. For this reason, even if fluctuations in the state of the communication medium is followed by shortening the cycle, the throughput in the entire system is not improved.

FIG. 14 is a graph showing a relation between a communication rate and the state of the communication medium in a conventional case where the communication-medium-characteristic detecting scheme is performed when the number of packet retransmissions exceeds a predetermined value. In FIG. 14, times T1013 and T1015 represent times when the cycle of detecting the communication-medium characteristic arrives. Time T1014 represents a time when the communication-medium-characteristic detecting scheme is performed because the number of packet retransmissions exceeds a predetermined value. As illustrated in FIG. 14, in the method of performing the communication-medium-characteristic detecting scheme when the number of packet retransmissions exceeds a predetermined value, if the state of the communication medium is deteriorated, a modulation parameter is changed so as to follow the deterioration, thereby decreasing the communication rate. However, even if the state of the communication medium is changed from a deteriorated state to an improved state, communication is performed by using the communication parameter adapted to the deteriorated state of the communication medium (refer to a section P2 in FIG. 14). Therefore, this poses a problem in which, even if the state of the communication medium is improved, the throughput is not improved.

As such, conventional problems include a decrease in throughput in the entire communication system because the communication parameter cannot follow the state of the communication medium particularly when the state of the communication medium is changed from a deteriorated state to an improved state, and a long time period from the time when the state of the communication medium is fluctuated to the time when the communication parameter is changed. These problem could further pose a problem, for example, in which a user cannot continuously view video streams of satisfactory quality during a period until the communication parameter is changed to an adequate one because the state of the communication medium is deteriorated.

SUMMARY OF THE INVENTION

Therefore, an object of the present invention to provide a communication terminal and a method for modulating and demodulating data by detecting a characteristic of a communication medium and following the state of the communication medium for modulating and demodulating data for transmission and reception, wherein a communication parameter is allowed to follow even a change in the state of the communication medium from a deteriorated state to an improved state.

In order to solve the problems mentioned above, the present invention has the following features. The present invention is directed to a communication terminal which modulates and demodulates a packet for transmission and reception based on a communication parameter for modulation and demodulation determined according to a communication-medium characteristic, including: information-element extracting means which extracts, with each predetermined cycle, information indicative of either one of transmission efficiency and reception quality of the packet as an information element; difference calculating means which calculates, with each said cycle, a difference between a first information element extracted by the information-element extracting means and a second information element previously extracted by the information-element extracting means; and detecting-scheme performance determining means which determines, based on the difference between the first information element and the second information element calculated by the difference calculating means, with each said cycle, whether a scheme of detecting the communication-medium characteristic for changing the communication parameter is to be performed.

Preferably, the communication terminal is at a side of transmitting the packet, and the information-element extracting means extracts a ratio of occurrence of retransmission of a transmission packet and an average number of packets not yet transmitted as the information element indicative of the transmission efficiency of the packet.

Preferably, the communication terminal is at a side of receiving the packet, and the information-element extracting means extracts an error correction rate of a reception packet as the information element indicative of the reception quality of the packet.

Preferably, the communication terminal is at a side of transmitting the packet, and the information-element extracting means extracts the information element indicative of the reception quality of the packet based on characteristic information indicative of the reception quality of the packet contained in an ACK packet returned from a communication terminal at a side of receiving the packet.

Preferably, the difference calculating means calculates a difference in the ratio of occurrence of retransmission and a difference in the average number of packets not yet transmitted, and the detecting-scheme performance determining means determines that the detecting scheme is to be performed when the difference in the ratio of occurrence of retransmission is equal to or larger than a predetermined threshold of the difference in the ratio of occurrence of retransmission or the difference in the average number of packets not yet transmitted is larger than a predetermined threshold of the difference in the average number of packets not yet transmitted.

Preferably, the detecting-scheme performance determining means further determines that the detecting scheme is to be performed when a transmission-speed setting value is smaller than a threshold of the transmission-speed setting value.

Preferably, the difference calculating means calculates a difference in the error correction rate, and the detecting-scheme performance determining means determines that the detecting-scheme is to be performed when the difference in the error correction rate is equal to or larger than a threshold of the difference in the error correction rate.

Preferably, the characteristic information is information indicative of a size of a portion requiring error correction in the packet received by the communication terminal at the receiving side.

Preferably, the information-element extracting means extracts an error correction rate indicative of the reception quality of the received packet as the information element based on the size.

Preferably the difference calculating means calculates a difference in the error correction rate, and the detecting-scheme performance determining means determines that the detecting-scheme is to be performed when the difference in the error correction rate is equal to or larger than a threshold of the difference in the error correction rate.

Preferably, the packet contains a simple evaluation series having a predetermined pattern for evaluating the reception quality, data of the simple evaluation series is smaller in size than data of an evaluation series which is used when the detecting scheme is performed for evaluating the communication-medium characteristic, and the characteristic information is any one of a CINR value, an SINR value, and a reception signal intensity calculated based on the data of the simple evaluation series contained in the packet received by the communication terminal at the receiving side.

Preferably, the information-element extracting means extracts any one of an average value of a plurality of said CINR values, an average value of a plurality of said SINR values, and an average value of a plurality of said reception signal intensities as the information element indicative of the reception quality of the received packet.

Preferably, the difference calculating means calculates any one of a difference in the average value of the CINR values, a difference in the average value of the SINR values, and a difference in the average value of the reception signal intensities, and the detecting-scheme performance determining means determines that the detecting scheme is to be performed when any calculated one of the difference in the average value of the CINR values, the difference in the average value of the SINR values, and the difference in the average value of the reception signal intensities is equal to or larger than a predetermined threshold.

Preferably, the detecting scheme is performed with each predetermined basic cycle, and the predetermined cycle is shorter than the predetermined basic cycle.

The predetermined cycle may be variable.

Preferably, the communication terminal further includes detecting-scheme performing means which transmits an evaluation-series packet for evaluating the communication-medium characteristic to a communication terminal at a receiving side when the detecting-scheme performance determining means determines that the detecting scheme is to be performed, receives an evaluation-result packet including results of evaluation of the communication-medium characteristic returned from the communication terminal at the receiving side, and changes the communication parameter based on the evaluation-result packet.

Furthermore, the present invention is directed to a method of determining timings of performing a scheme of detecting a communication-medium characteristic for determining a communication parameter for use in modulation and demodulation of a packet, including the steps of: extracting, with each predetermined cycle, information indicative of either one of transmission efficiency and reception quality of the packet as an information element; calculating, with each said cycle, a difference between a first information element extracted in the information-element extracting step and a second information element previously extracted in the information-element extracting step; and determining, based on the difference between the first information element and the second information element calculated in the calculating step, with each said cycle, whether a scheme of detecting the communication-medium characteristic for changing the communication parameter is to be performed.

Preferably, in the information-element extracting step, the information element indicative of the reception quality of the packet is extracted based on characteristic information indicative of the reception quality of the packet contained in an ACK packet returned from a communication terminal at a side of receiving the packet.

Still further, the present invention is directed to an integral circuit which modulates and demodulates a packet for transmission and reception based on a communication parameter for modulation and demodulation determined according to a communication-medium characteristic, including: information-element extracting means which extracts, with each predetermined cycle, information indicative of either one of transmission efficiency and reception quality of the packet as an information element; difference calculating means which calculates, with each said cycle, a difference between a first information element extracted by the information-element extracting means and a second information element previously extracted by the information-element extracting means; detecting-scheme performance determining means which determines, based on the difference between the first information element and the second information element calculated by the difference calculating means, with each said cycle, whether a scheme of detecting the communication-medium characteristic for changing the communication parameter is to be performed; and detecting-scheme performing means which transmits an evaluation-series packet for evaluating the communication-medium characteristic to a communication terminal at a receiving side when the detecting-scheme performance determining means determines that the detecting scheme is to be performed, receives an evaluation-result packet including results of evaluation of the communication-medium characteristic returned from the communication terminal at the receiving side, and changes the communication parameter based on the evaluation-result packet.

According to the present invention, a difference in the information element indicative of either one of the transmission efficiency and the reception quality of the packet is calculated, thereby detecting whether a fluctuation has occurred to a predetermined degree or more in either calculated one of the transmission efficiency and the reception quality. If the difference is equal to or larger than a predetermined threshold, it can be estimated that a fluctuation has occurred to a predetermined degree or more in either calculated one of the transmission efficiency and the reception quality, that is, a fluctuation has occurred to a predetermined degree or more in the state of the communication medium. If it is estimated as such, the communication terminal determines to perform the communication-medium-characteristic detecting scheme, and then performs the communication-medium-characteristic detecting scheme. Therefore, detection can be performed not only when the state of the communication medium is deteriorated but also the state is improved. Also, the information element is extracted based on the information obtained during a normal procedure in packet transmission and reception. Therefore, the present invention allows a communication parameter to be selected so as to follow the state of the communication medium for communication without decreasing the throughput in the entire communication system.

These and other objects, features, aspects and advantages of the present invention will become more apparent from the following detailed description of the present invention when taken in conjunction with the accompanying drawings.

BRIEF DESCRIPTION OF THE DRAWINGS

FIG. 9A is an illustration showing one example of a data packet format of a data packet partially containing a portion assumed to be an evaluation series;

FIG. 9B is an illustration showing another example of the data packet format of a data packet partially containing a portion assumed to be an evaluation series;

DESCRIPTION OF THE PREFERRED EMBODIMENTS (First Embodiment)

Figure 1:
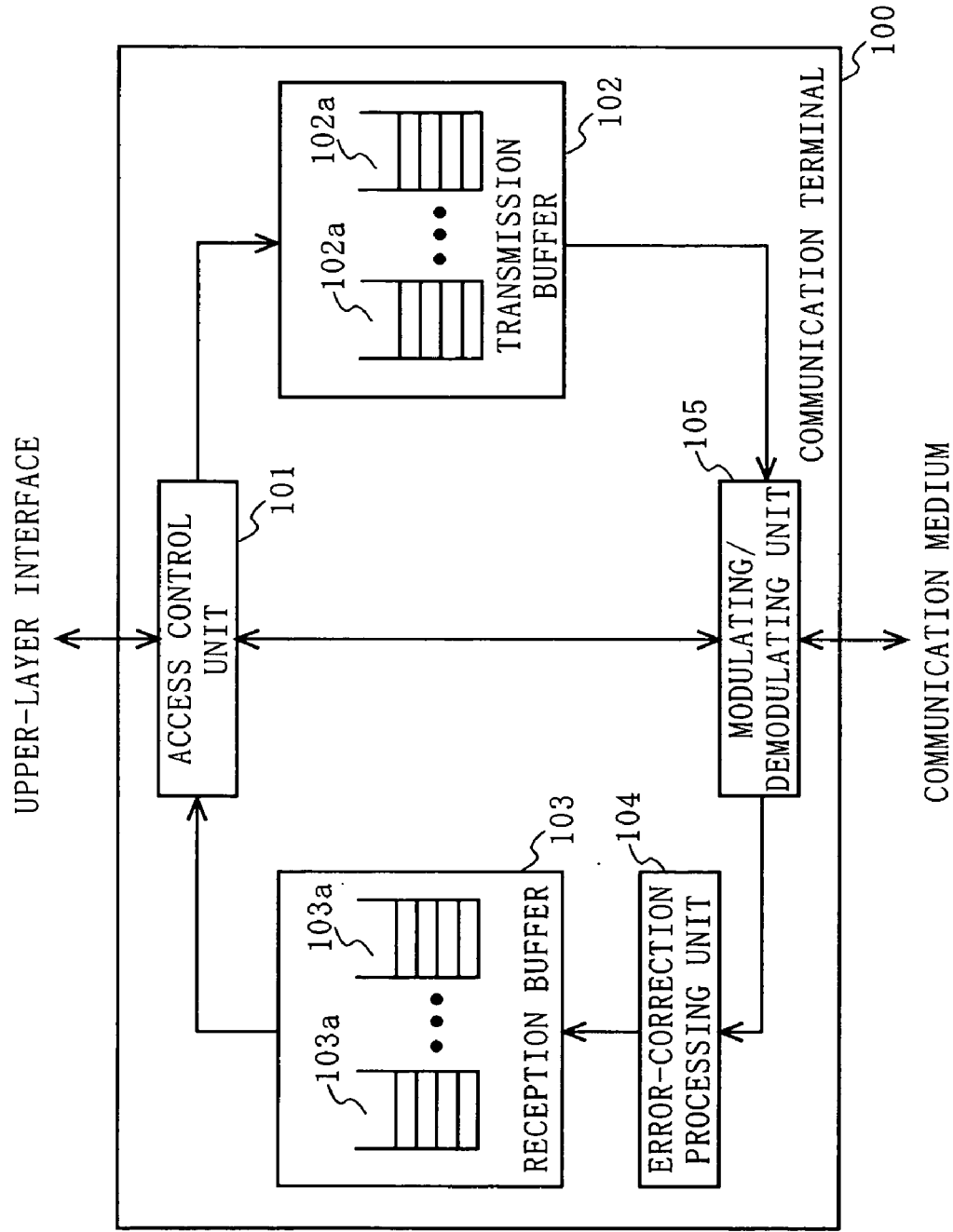
FIG. 1 is a block diagram showing the structure of a communication terminal 100 according to a first embodiment of the present invention.

FIG. 1 is a block diagram showing the structure of a communication terminal 100 according to a first embodiment of the present invention. In FIG. 1, a communication terminal 100 includes an access control unit 101, a transmission buffer 102, a reception buffer 103, an error-correction processing unit 104, and a modulating/demodulating unit 105. The communication terminal 100 uses a multi-carrier transmission scheme to modulate or demodulate a packet containing data to be transmitted to or received from an upper-layer or a control packet with a lower-layer (hereinafter simply referred to as a packet) for transmission or reception. Hereinafter, as a typical example, description is made to transmission or reception of a packet containing data to be transmitted to or received from an upper layer. However, the description can also be applied to transmission or reception of a control packet or the like with a lower layer. The communication terminal 100 transmits a packet to another communication terminal according to an access schedule described in a schedule packet transmitted from a control terminal (not shown) on a network. A communication medium between these communication terminals may be wired or wireless.

The access control unit 101 controls an access to the communication medium from the communication terminal 100. For performing a communication-medium-characteristic detecting scheme, the access control unit 101 causes an evaluation-series packet to be transmitted to the modulating/demodulating unit 105. In response to this, based on an evaluation-result packet returned from the communication terminal at the receiving side, the access control unit 101 ascertains a communication-medium characteristic for each sub-carrier, determines a communication parameter for each sub-carrier, and instructs the modulating/demodulating unit 105 to use the communication parameter for modulation or demodulation. The communication parameter includes information about which sub-carrier is to be used, an index of modulation with the sub-carrier to be used, and information about a modulating scheme with the sub-carrier to be used.

The transmission buffer 102 includes one or more transmission queues 102a each for each of destination communication terminals as communication counterparts (or for each packet type) for storing transmission packets.

The reception buffer 103 includes one or more reception queues 103a each for each of transmission-source communication terminals (or for each packet type) for storing received packets.

The error-correction processing unit 104 performs error correction on a reception packet, and then stores the error-corrected packet in one of the reception queue 103a.

The modulating/demodulating unit 105 demodulates a packet received through the communication medium based on the communication parameter provided by the access control unit 101, and then sends the packet to the error-correction processing unit 104. Also, the modulating/demodulating unit 105 modulates a packet stored in one of the transmission queue 102a, and then transmits the modulated packet via the communication medium.

In the communication terminal 100, data from the upper layer via an upper-layer interface is passed to the access control unit 101. The access control unit 101 packetizes the data, and stores packets in the transmission queues 102a for each destination communication terminal (or for each packet type). When a predetermined transmission timing arrives, the access control unit 101 causes a transmission packet to be read from the transmission buffer 102, causes the modulating/demodulating unit 105 to modulate the packet by using the current communication parameter, and then causes the modulated data to be sent to the communication medium. Upon receipt of a notification from the communication-counterpart terminal that a packet has failed to be normally received, the access control unit 101 again causes the packet which failed to be normally received to be read from the transmission buffer 102 for retransmission.

In the communication terminal 100, when packet reception, the modulating/demodulating unit 105 demodulates the received packet according to the set communication parameter. Then, the error-correction processing unit 104 performs an error-correction processing, and then stores the error-corrected received packet in one of the reception queue 103a. The access control unit 101 obtains a reception packet stored in one of the reception queue 103a for transfer to the upper layer through the upper interface.

The access control unit 101 calculates, for each of the transmission-counterpart terminals, the number of packets to be transmitted (hereinafter referred to as the number of transmission packets) for each timing for packet transmission, and then causes the number of transmission packets to be stored in the transmission buffer 102.

The access control unit 101 counts, for each of the transmission counterpart terminals, the number of retransmissions of a packet (hereinafter referred to as the number of packet retransmissions) for each timing of receiving a notification from the terminal at the receiving side that a packet failed to be normally received or for each timing of retransmitting a packet, and then causes the number of packet retransmissions to be stored in the transmission buffer 102.

The access control unit 101 retains a first timer for counting a predetermined cycle for performing the communication-medium-characteristic detecting scheme. When notified by the first timer that the predetermined cycle for performing the communication-medium-characteristic detecting scheme arrives, the access control unit 101 performs the communication-medium-characteristic detecting scheme with this notification being taken as a trigger. Hereinafter, the predetermined cycle for performing the communication-medium-characteristic detecting scheme is referred to as a basic cycle.

Also, the access control unit 101 retains a second timer for counting a predetermined cycle which is shorter than the basic cycle for analyzing fluctuations of information elements (which will be described further below). When notified by the second timer that the predetermined cycle for analyzing fluctuations of the information elements arrives, the access control unit 101 starts analyzing fluctuations of the information elements. Hereinafter, the predetermined cycle for analyzing fluctuations of the information elements is referred to as a fluctuation analyzing cycle. Note that the fluctuation analyzing cycle may be synchronized with a sampling cycle of an analog signal.

Figure 2:
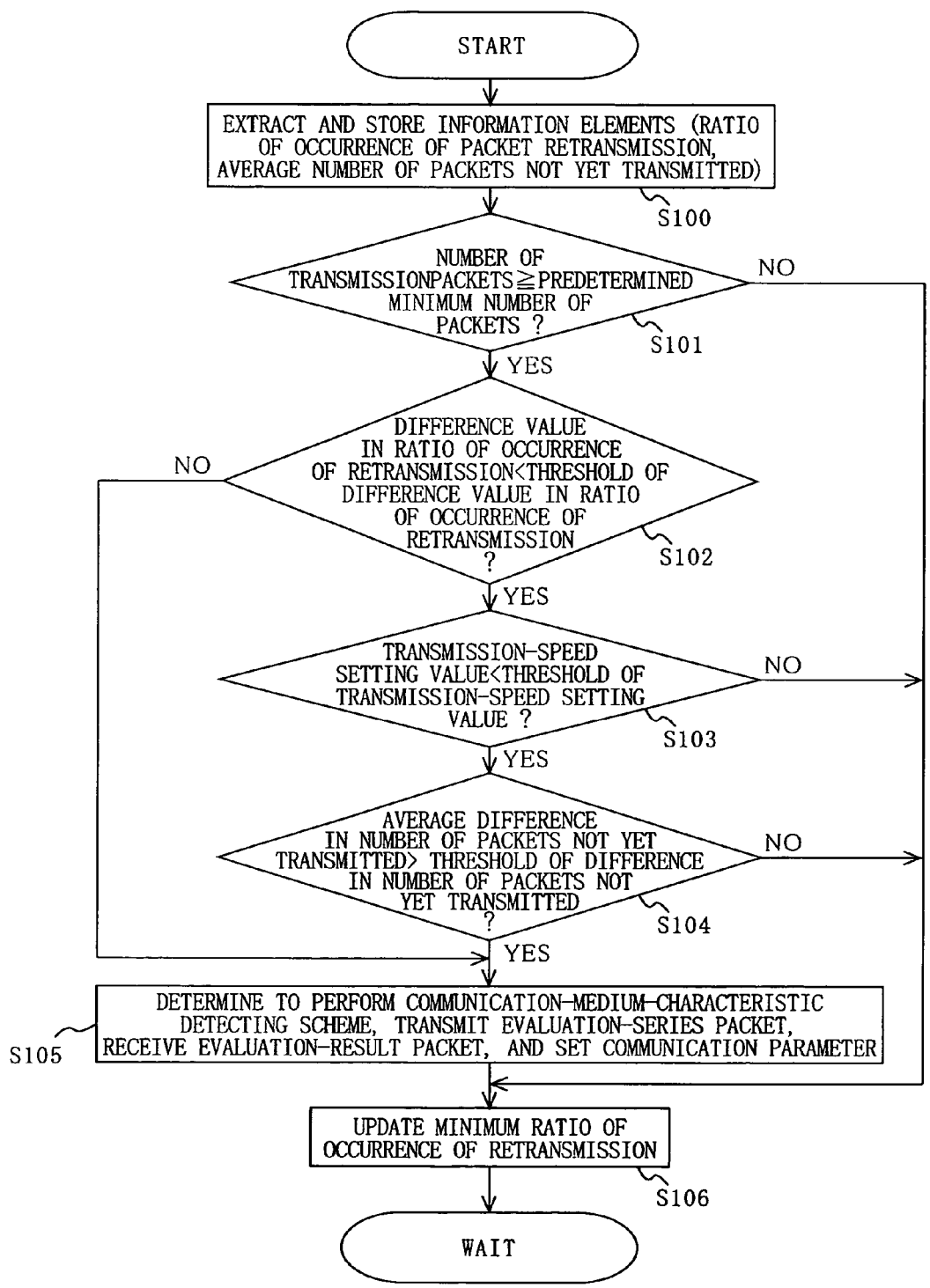
FIG. 2 is a flowchart showing an operation of an access control unit 101 in a fluctuation analyzing cycle.

FIG. 2 is a flowchart showing the operation of the access control unit 101 in a fluctuation analyzing cycle. With reference to FIG. 2, the operation of the access control unit in a fluctuation analyzing cycle is described below. Note that packet transmission/reception is performed concurrently with the operation shown in FIG. 2. Therefore, the number of transmission packets and the number of packet retransmissions are stored concurrently with the operation shown in FIG. 2.

The procedure shown in FIG. 2 starts with a notification from the second timer of starting a fluctuation analyzing cycle as a trigger.

First, the access control unit 101 performs a process of extracting and storing an information element (step S100). Here, the information element is a piece of information reflecting the state of the communication medium, and can be obtained as a result of packet transmission. The information element according to the first embodiment are a piece of information indicative of packet transmission efficiency. In order to reduce a processing load on the communication terminal, the information element is preferably a piece of information that can be easily calculated. In the first embodiment, as the information elements, a ratio of occurrence of packet retransmission and an average number of packets not yet transmitted are used for indicating the packet transmission efficiency. Note that the information elements described herein are merely an example, and are not meant to be restrictive as long as they are pieces of information indicative of the packet transmission efficiency.

Specifically, in step S100, the access control unit 101 calculates a ratio of occurrence of retransmission based on a total number of transmission packets and a total number of packet retransmissions at the time of starting a fluctuation analyzing cycle, and then causes the calculated ratio to be stored in the transmission buffer 102. For example, the ratio of occurrence of retransmissions is calculated by (the total number of packet retransmission)/(the total number of transmission packets+ the total number of packet retransmission).

Also, in step S100, the access control unit 101 counts and the number of packets not yet transmitted that are contained in the transmission queues 102a for each communication counterpart and, based on the summed results, calculates an average number of packets not yet transmitted, and then causes the calculated number to be stored in the transmission buffer 102. For example, the average number of packets not yet transmitted is calculated by (an average number of packets not yet transmitted at the time of starting the previous fluctuation analyzing cycle+the number of packets not yet transmitted at the time of starting the current fluctuation analyzing cycle)/2. The average number of packets not yet transmitted is a numerical value indicating the degree of a load imposed on packet transmission depending on the state of the communication medium. As the average number of packets not yet transmitted is larger, the load is larger.

Next, the access control unit 101 determines whether data having an amount enough to estimate the state of the communication medium has been transmitted in a data sequence for transmitting a group of transmission packets from the transmitting side to the receiving side. This determination is made depending on whether the number of transmission packets stored in the transmission buffer 102 is equal to or larger than a predetermined minimum number of packets (step S101). If the number of transmission packets is not larger than the minimum number of packets, the access control unit 101 goes to an operation in step S106. On the other hand, if the number of transmission packets is equal to or larger than the predetermined minimum number of packets, the access control unit 101 goes to an operation in step S102.

In step S102, the access control unit 101 calculates, as a difference value in ratio of occurrence of retransmission, an absolute value of a difference between a ratio of occurrence of retransmission in the current fluctuation analyzing cycle (first information element) and a minimum value of ratios of occurrence of retransmission previously calculated (hereinafter referred to as a minimum ratio of occurrence of retransmission) (second information element), and then determines whether the calculated difference value in ratio of occurrence of retransmission is smaller than a predetermined threshold of the difference value in the ratio of occurrence of retransmission. Note that the minimum ratio of occurrence of retransmission is not yet set in the first fluctuation analyzing cycle, and therefore is 0. In any of the following fluctuation analyzing cycles, the value set in step S106, which will be described further below, is used as the minimum ratio of occurrence of retransmission.

If the difference value in ratio of occurrence of retransmission is not smaller than the threshold of the difference value in the ratio of occurrence of retransmission, the access control unit 101 goes to an operation in step S105. On the other hand, if the difference value in ratio of occurrence of retransmission is smaller than the threshold of the difference value in the ratio of occurrence of retransmission, the access control unit 101 goes to an operation in step S103.

In step S103, the access control unit 101 calculates a transmission-speed setting value, and then determines whether the calculated transmission-speed setting value is smaller than a threshold of the transmission-speed setting value. Specifically, the access control unit 101 calculates, for each sub-carrier, an amount of data that can be transmitted per one symbol block (in units of bits) based on the communication parameter set in the modulating/demodulating unit 105, and then sums the calculated amounts of data for calculating the transmission-speed setting value.

If the calculated transmission-speed setting value is not smaller than the threshold of the transmission-speed setting value, the access control unit 101 goes to the operation in step S106. On the other hand, if the calculated transmission-speed setting value is smaller than the threshold of the transmission-speed setting value, the access control unit 101 goes to an operation in step S104.

In step S104, the access control unit 101 divides an absolute value of a difference between an average number of packets not yet transmitted that is calculated in the current fluctuation analyzing cycle (first information element) and an average number of packets not yet transmitted that was calculated in the previous fluctuation analyzing cycle (second information element) by the average number of packets not yet transmitted, thereby calculating an average difference in the number of packets not yet transmitted, and then determines whether the calculated average difference in the number of packets not yet transmitted is larger than a predetermined threshold of the average difference in the number of such packets. Note that, as long as a difference from an average number of packets not yet transmitted that was calculated in any of previous fluctuation analyzing cycles is calculated, the difference is not restricted to the difference from the average number of packets not yet transmitted that was calculated in the immediately-previous fluctuation analyzing cycle.

If the average difference in the number of packets not yet transmitted is not larger than the threshold of the difference value in the number of such packets, the access control unit 101 goes to the operation in step S106. If the average difference in the number of packets not yet transmitted is larger than the threshold of the difference value in the number of such packets, the access control unit 101 goes to an operation in step S105.

In step S105, the access control unit 101 determines that the communication-medium-characteristic detecting scheme is to be performed, transmits an evaluation-series packet to the communication terminal at the receiving side, and then, based on an evaluation-result packet returned in response, resets the communication parameter. After the operation in step S105, the access control unit 101 goes to the operation in step S106. Note that, once the communication-medium-characteristic detecting scheme is performed, the fluctuation analyzing cycle may be restarted after the completion of the scheme, or the fluctuation analyzing cycle may arrive without changing its cycle.

In step S106, the access control unit 101 restores a minimum value among the previous ratios of occurrence of retransmission in the transmission buffer 102 as a minimum ratio of occurrence of retransmission.

The operations in steps S100 through S106 are performed from the start of the fluctuation analyzing cycle and the end thereof. After the operations in steps S100 through S106 are completed, the access control unit 101 waits until the time of starting the next fluctuation analyzing cycle arrives to start the operation shown in FIG. 2.

Figure 3:
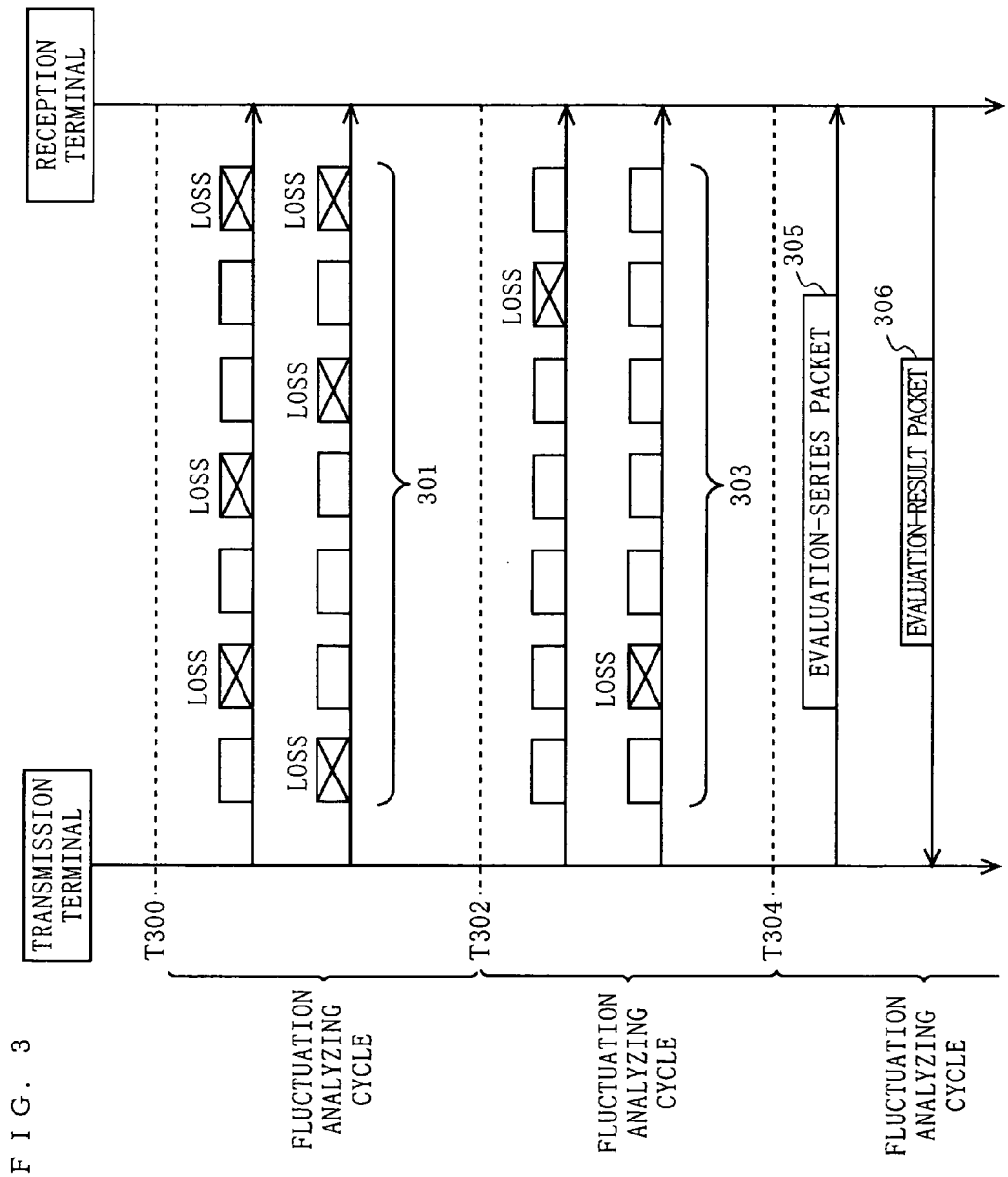
FIG. 3 is a sequence diagram for describing an example of timings of performing a communication-medium-characteristic detecting scheme when the state of a communication medium is changed from a deteriorated state to an improved state.

FIG. 3 is a sequence diagram for describing an example of timings of performing the communication-medium-characteristic detecting scheme when the state of the communication medium is changed from a deteriorated state to an improved state. Hereinafter, with reference to FIG. 3, description is made to the example of timings of performing the communication-medium-characteristic detecting scheme when the state of the communication medium is changed from a deteriorated state to an improved state.

Firstly, it is assumed that, when a time T300 for starting a fluctuation analyzing cycle arrives, a transmission terminal (which herein after means a communication terminal at a transmitting side) has already transmitted a plurality of packets as a date sequence 301 to a reception terminal (which hereinafter means a communication terminal at a receiving side). At the time of transmitting the packets, the access control unit 101 causes the number of transmission packets and the number of packet retransmissions to be stored in the transmission buffer 102. When the time T300 arrives, the transmission terminal calculates a ratio of occurrence of retransmission and an average number of packets not yet transmitted as information elements, and then causes the calculated values to be stored in the transmission buffer 102 (refer to step S100 in FIG. 2).

Here, between the time T300 and a time T302 for starting the next fluctuation analyzing cycle, it is assumed that no large fluctuations occur in the state of the communication medium. In this case, a ratio of packet losses in the data sequence 301 is not significantly fluctuated. When the time T302 arrives, the transmission terminal calculates a ratio of occurrence of retransmission and an average number of packets not yet transmitted, and then causes the calculated values to be stored in the transmission buffer 102 (refer to step S100 in FIG. 2). With the ratio of packet losses being not significantly fluctuated, the difference value in ratio of occurrence of retransmission is smaller than the threshold of the difference value in ratio of occurrence of retransmission (refer to a flow to YES in step S102 of FIG. 2). At this time, if the transmission-speed setting value is equal to or larger than the threshold of the transmission-speed setting value (refer to a flow to NO in step S103 of FIG. 2), the communication-medium-characteristic detecting scheme is not performed after the time T300. This is to prevent an unnecessary execution of the communication-medium-characteristic detecting scheme under circumstances where a certain speed and a certain success rate are guaranteed. Then, the access control unit 101 updates the minimum ratio of occurrence of retransmission (refer to step S106 in FIG. 2).

Next, it is assumed that the state of the communication medium is greatly improved after the time T302. In this case, a ratio of packet losses from the transmission terminal to the reception terminal is decreased (refer to a data sequence 303 in FIG. 3). Therefore, after the difference value in the ratio of occurrence of retransmission calculated by the access control unit 101 in step S102 after a time T304 for starting the fluctuation analyzing cycle is increased to be equal to or larger than the threshold of the ratio of occurrence of retransmission. If the difference value in the ratio of occurrence of retransmission is equal to or larger than the threshold of the ratio of occurrence of retransmission, the access control unit 101 performs the process of step S106.

Therefore, the transmission terminal transmits an evaluation-series packet 305 to the reception terminal. In response, the reception terminal detects a communication-medium characteristic for each sub-carrier, and then returns an evaluation-result packet 306 containing the detection results to the transmission terminal. Upon reception of the evaluation-result packet 306, the transmission terminal resets the communication parameter based on the evaluation results, and then restarts data transmission.

Conventionally, the communication-medium-characteristic detecting scheme is performed only when the number of retransmissions excess a threshold. In the present invention, it is determined whether the state of the communication medium is changed from a deteriorated state to an improved state by determining whether the difference value in the ratio of occurrence of retransmission is equal to or larger than the threshold of the difference value in the ratio of occurrence of retransmission, thereby automatically performing the communication-medium-characteristic detecting scheme. Therefore, the communication parameter can be determined so as to follow the changes in the communication-medium characteristic.

Figure 4:
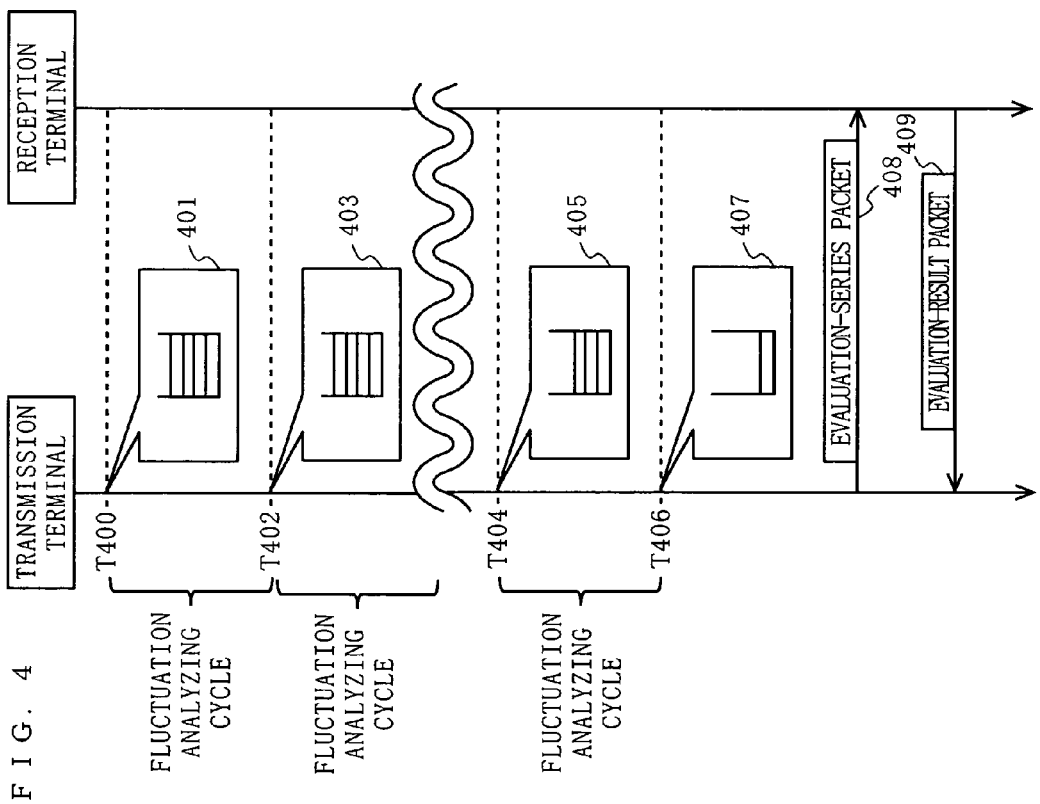
FIG. 4 is a sequential diagram for describing another example of the timings of performing a communication-medium-characteristic detecting scheme when the state of the communication medium is changed from a deteriorated state to an improved state.

FIG. 4 is a sequential diagram for describing another example of the timings of performing the communication-medium-characteristic detecting scheme when the state of the communication medium is changed from a deteriorated state to an improved state. Hereinafter, with reference to FIG. 4, description is made to the other example of timings of performing the communication-medium-characteristic detecting scheme when the state of the communication medium is changed from a deteriorated state to an improved state.

In FIG. 4, firstly, in a deteriorated state of the communication medium, it is assumed that the state of the communication medium is not significantly fluctuated after the communication parameter is set. In this case, the state of a load on the communication medium is not changed, and therefore the numbers of packets not yet transmitted in transmission queues 401 and 403 are not significantly changed. Therefore, a difference between an average number of packets not yet transmitted at a time T400 for starting a fluctuation analyzing cycle and an average number of packets not yet transmitted at a time T402 for starting another fluctuation analyzing cycle is smaller than the threshold of the number of packets not yet transmitted. Therefore, in the fluctuation analyzing cycle starting at the time T402, the communication-medium-characteristic detecting scheme is not performed (refer to a flow to NO in step S104 of FIG. 2).

Then, it is assumed that, after a while, the state of the communication medium is gradually improved from a deteriorated state. In this case, although the communication parameter is set so that the communication rate is low, packet losses are decreased due to the improvement of the state of the communication medium. Therefore, packets become easy to pass and, as shown in transmission queues 405 and 407, the number of packets not yet transmitted is decreased. In such a case, at a time T406 for starting a fluctuation analyzing cycle, the number of packets not yet transmitted in the transmission queue 407 is decreased compared with the number of packets not yet transmitted in the transmission queue 405 at the time T404 for starting the previous fluctuation analyzing cycle. Therefore, the difference from the average number of packets not yet transmitted can be larger than the threshold of the difference value in the number of such packets. Also, since the state of the communication medium is originally assumed to be deteriorated, the transmission-speed setting value is smaller than the threshold of the transmission-speed setting value. For this reason, the operation goes to a flow to YES in step S103 and then YES in step S104 of FIG. 2, and thus the communication-medium-characteristic detecting scheme is performed. Therefore, the transmission terminal transmits an evaluation-series packet 408 for detecting a communication-medium characteristic to the reception terminal. Using the evaluation-series packet 408, the reception terminal detects a communication-medium characteristic, and then notifies the transmission terminal of the detection results as an evaluation-result packet 409. Upon reception of the evaluation-result packet 409, the transmission terminal resets the communication parameter based on the evaluation results, and then restarts data transmission. With this, even when the state of the communication medium is changed from a deteriorated state to an improved state, the transmission terminal can automatically perform a communication-medium-characteristic detecting scheme, thereby determining the communication parameter so as to follow the changes of the communication-medium characteristic.

Even after the communication parameter is updated, the state of the communication medium is continuously fluctuated. Therefore, in synchronization with the fluctuation analyzing cycles, the operation of FIG. 2 is performed. Even when the state of the communication medium is significantly deteriorated, the ratio of occurrence of retransmission is significantly fluctuated similarly with the case where the state of the communication medium is improved. Thus, the difference value in the ratio of occurrence of retransmission is larger than the threshold of the difference value in the ratio of occurrence of retransmission, and therefore the operation goes to a flow to NO in step S102 of FIG. 2, thereby performing the communication-medium-characteristic detecting scheme.

Figure 5:
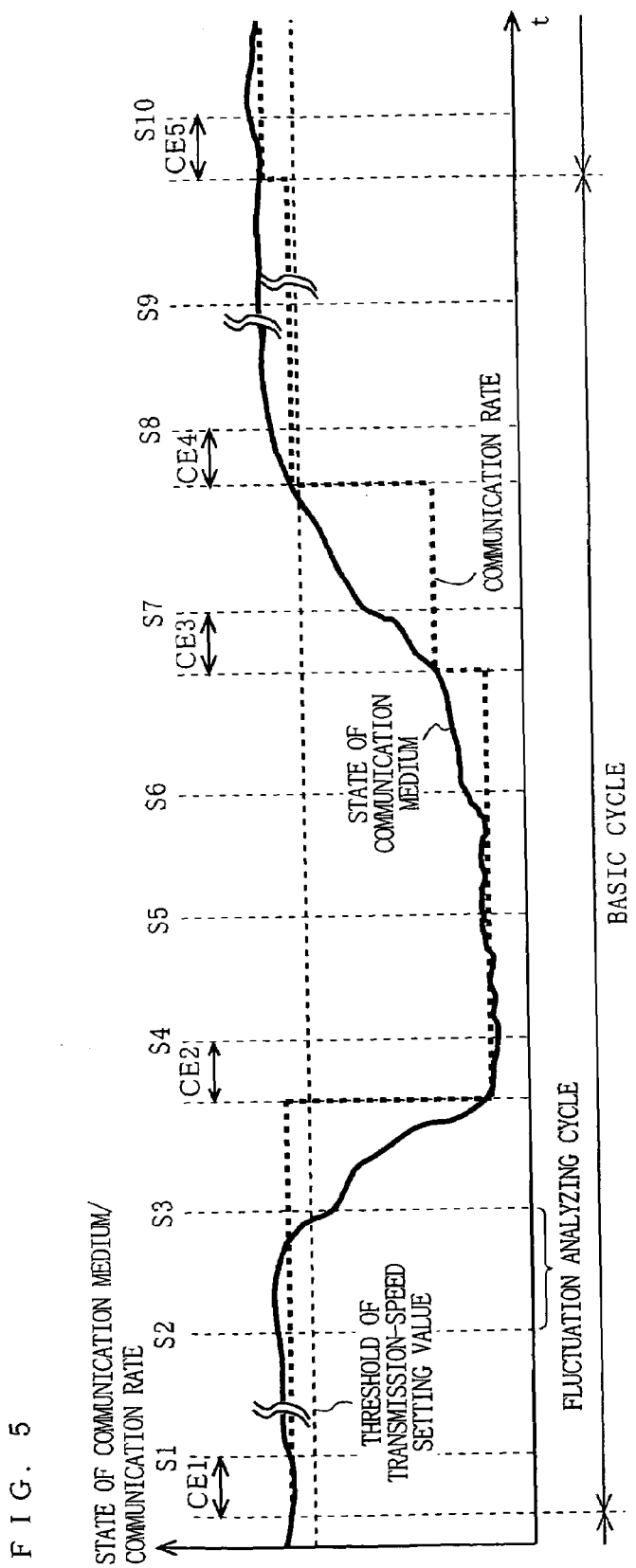
FIG. 5 is a graph showing a relation between the state of the communication medium and a communication rate when the communication terminals according to the first embodiment are used.

FIG. 5 is a graph showing a relation between the state of the communication medium and a communication rate when the communication terminals according to the first embodiment are used. Hereinafter, with reference to FIG. 5, description is made to the relation between the state of the communication medium and the communication rate when the communication terminals according to the first embodiment are used.

In FIG. 5, the vertical axis indicates values of the state of the communication medium or values of the communication rate. The value which is more positive on the vertical axis indicates a more satisfactory state of the communication medium and a higher transmission-speed setting value. A bold solid line indicates changes in the state of the communication medium. A bold dotted line indicates changes in the communication rate. A thin dotted line indicates the threshold of the transmission-speed setting value. The horizontal axis indicates time. Times for starting a fluctuation analyzing cycle are represented by times S1 through S10. In FIG. 5, sections denoted as CE1 through CE5 indicate period during which the communication-medium-characteristic detecting scheme is performed.

In FIG. 5, when the basic cycle of the communication-medium-characteristic detecting scheme starts, the communication-medium-characteristic detecting scheme is performed in the section CE1. With this, the communication parameter is set. In FIG. 5, the communication rate derived from the set communication parameter is initially assumed to be larger than the threshold of the transmission-speed setting value. Therefore, the procedure goes to a flow to NO in step S103 of FIG. 2, thereby not performing the communication-medium-characteristic detecting scheme.

FIG. 5 shows that the state of the communication medium becomes suddenly deteriorated around the time S3. In such a case, a difference between the ratio of occurrence of retransmission and the minimum ratio of occurrence of retransmission at the time S3 is large. Here, it is assumed that the difference value in the ratio of occurrence of retransmission becomes larger than the threshold of the difference value in the ratio of occurrence of retransmission. In this case, the procedure goes to a flow to NO in step S102 of FIG. 2. Therefore, the communication-medium-characteristic detecting scheme is performed in the section CE2 (step S105). With this, it is detected that the state of the communication medium is changed from a satisfactory state to a deteriorated state, and, based on the state of the communication medium at the start of the section CE2 (at the time of transmitting an evaluation-series packet), the communication parameter is set. With this, the communication parameter is set so as to follow the deteriorated state of the communication medium.

From the time S4 to the time S5, the state of the communication medium is kept in a low state. Therefore, packets stored around the time T3 and yet not transmitted are not decreased. Thus, the procedure goes to a flow to NO in step S104 of FIG. 2, thereby not performing the communication-medium-characteristic detecting scheme.

Thereafter, around the time S6, the state of the communication medium demonstrates a tendency for improvement. In such a case, even if the communication rate is set low, packet losses due to influences of noise on the communication medium tend to be decreased. Therefore, the stored packets not yet transmitted starts decreasing. Therefore, the procedure goes to a flow to YES in step S104 of the operation shown in FIG. 2 and performed at the time T6 for starting sampling. With this, in the section CE3, the communication-medium-characteristic detecting scheme is performed, the communication parameter is updated, and the communication rate is increased. An example of such a flow of the procedure is shown in FIG. 4.

If the state of the communication medium demonstrates a tendency for improvement around the time S6, for example, the difference value in the ratio of occurrence of retransmission may become larger than the threshold of the difference value in the ratio of occurrence of retransmission. With this, the procedure may go to a flow to NO in step S102, thereby performing the communication-medium-characteristic detecting scheme. A typical case in which the procedure goes to a flow to NO in step S102 is the case where the state of the communication medium is suddenly improved. An example of such a flow of the procedure is shown in FIG. 3.

Also at the time S7, the state of the communication medium demonstrates a tendency for improvement. Therefore, the procedure goes to a flow to YES in step S104 or a flow to NO in step S102, thereby performing the communication-medium-characteristic detecting scheme in the section CE4, updating the communication parameter, and increasing the communication rate.

Then, at the time S8 and thereafter, the state of the communication medium demonstrates a tendency for further improvement. However, the communication rate is larger than the threshold of the transmission-speed setting value, and therefore the procedure goes to a flow to NO in step S103, thereby not performing the communication-medium-characteristic detecting scheme. Then, when the next basic cycle arrives, the communication-medium-characteristic detecting scheme is performed in the section CE5, and the communication parameter suitable at that time is set.

As such, unlike the conventional case where it is merely determined whether the number or retransmissions exceeds the predetermined value, the communication terminal according to the first embodiment compares a difference in an information element indicative of the packet transmission efficiency, such as the ratio of occurrence of retransmission or the number of packets not yet transmitted, with a predetermined threshold. Therefore, the communication terminal can detect whether the packet transmission efficiency is changed to a predetermined degree or more. In the conventional technology, the fact that the number of retransmissions is increased merely tells a phenomenon that the communication-medium characteristic is deteriorated. In the communication terminal according to the first embodiment, in addition to the phenomenon that the communication-medium characteristic is deteriorated, a phenomenon that the communication-medium characteristic is improved can also be detected. Therefore, in the communication terminal according to the first embodiment, even if the state of the communication medium is changed from a deteriorated state to an improved state, the communication parameter can be made so as to suitably follow the state of the communication medium. Therefore, it is possible to provide a communication terminal allowing an improvement in throughput in the entire communication system and a reduction in time taken from the time when the state of the communication medium is fluctuated to the time when the communication parameter is changed.

Here, in the first embodiment, the information element, such as the ratio of occurrence of retransmission or the number of packets not yet transmitted, is calculated at the start of the fluctuation analyzing cycle (refer to step S100 in FIG. 2). Alternatively, such calculation is performed in a step of comparing a difference value with a threshold (step S102 or S104 in FIG. 2). Also, the access control unit 101 may calculate each of the information elements (the ratio of occurrence of retransmission and the number of packets not yet transmitted) whenever it obtains information (for example, a total number of packet retransmissions, a total number of transmission packets, and the number of packets not yet transmitted) for calculating the information element to store the calculated element in the transmission buffer 102, and whenever the operation in step S100, S102, or S104 is performed, may extract the stored information element.

Also, in the first embodiment, in order to calculate a difference value in the ratio of occurrence of retransmission, an absolute value of a difference between the ratio of occurrence of retransmission calculated in the current fluctuation analyzing cycle and a minimum ratio of occurrence of retransmission is calculated. Alternatively, an absolute value of a difference between the ratio of occurrence of retransmission calculated in the current fluctuation analyzing cycle and a ratio of occurrence of retransmission calculated in the previous fluctuation analyzing cycle may be taken as the difference value in the ratio of occurrence of retransmission. Also, instead of the ratio of occurrence of retransmission calculated in the immediately-previous fluctuation analyzing cycle, a ratio of occurrence of retransmission calculated in any one of previous fluctuation analyzing cycles can be used for ascertaining a fluctuation in the packet transmission efficiency.

Furthermore, in the first embodiment, the access control unit 101 compares the difference value in the ratio of occurrence of retransmission with its threshold (step S102), and then compares the average difference in the number of packets not yet transmitted with its threshold (step S104). Alternatively, the access control unit 101 may compare the average difference in the number of packets not yet transmitted with its threshold, and then may compare the difference value in the ratio of occurrence of retransmission with its threshold.

Still further, the transmission-speed setting value is compared with its threshold (step S103). Alternatively, this process may be omitted.

Still further, in the first embodiment, the amount of data that that can be transmitted per one symbol block is used as the transmission-speed setting value. Alternatively, the number of sub-carriers in use may be used as the transmission-speed setting value.

Still further, the process in step S101 of determining whether the number of packets is equal to or larger than the minimum number of packets is not an indispensable process.

(Second Embodiment)

In a second embodiment, the structure of a communication terminal is similar to that according to the first embodiment. Therefore, FIG. 1 is also referred to for description. However, in the first embodiment, whether to perform the communication-medium-characteristic detecting scheme is determined by the communication terminal at the transmitting side. In the second embodiment, whether to perform the communication-medium-characteristic detecting scheme is determined by the communication terminal at the receiving side, which requests the communication terminal at the transmitting side to perform the communication-medium-characteristic detecting scheme. In the communication terminal at the receiving side according to the second embodiment, the functions of the access control unit 101 and the modulating/demodulating unit 105 are different from those according to the first embodiment. Hereinafter in the second embodiment, unless otherwise mentioned, the access control unit 101 and the modulating/demodulating unit 105 are assumed to refer to the access control unit 101 and the modulating/demodulating unit 105 of the communication terminal at the receiving side.

The modulating/demodulating unit 105 demodulates a packet received via the communication medium, and causes the error-correction performing unit 104 to perform error correction. At this time, the modulating/demodulating unit 105 causes a bit length of the received packet (hereinafter referred to as a received-packet bit length) to be stored in the reception buffer 103. Also, the modulating/demodulating unit 105 obtains the number of bits requiring error correction (hereinafter referred to as the number of error-correction bits) from the error-correction processing unit 105, and then causes the number to be stored in the reception buffer 103. Furthermore, the modulating/demodulating unit 105 calculates a total received-packet bit length so far, and then causes the total to be stored in the reception buffer 103. Based on the state of storage in the reception queues 103a, the access control unit 101 counts the number of received packets for each transmission terminal, and then causes the number to be stored in the reception buffer 103.

As with the access control unit 101 in the communication terminal at the transmitting side, the access control unit 101 retains a timer for counting a fluctuation analyzing cycle. However, basically, the fluctuation analyzing cycle at the receiving side and the fluctuation analyzing cycle at the transmitting side are not synchronized with each other.

Figure 6:
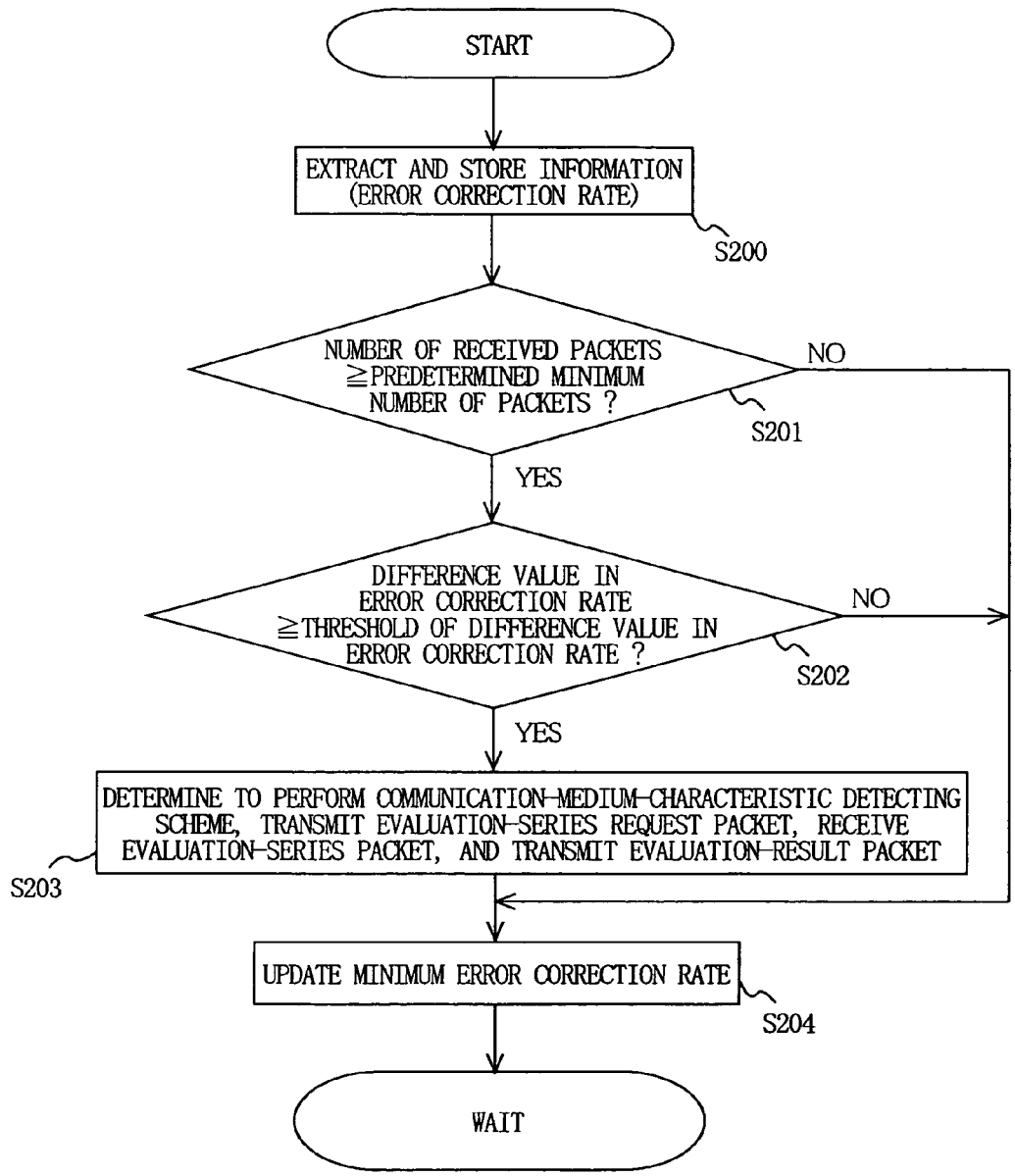
FIG. 6 is a flowchart showing an operation of the access control unit 101 in the structure of the communication terminal 100 according to the second embodiment of the present invention.

FIG. 6 is a flowchart showing an operation of the access control unit 101 in the communication terminal 100 according to the second embodiment of the present invention. Hereinafter, with reference to FIG. 6, the operation of the access control unit 101 in a fluctuation analyzing cycle is described. Note that packet reception and demodulation is performed concurrently with the operation shown in FIG. 6. Therefore, the received-packet bit length, the total received-packet bit length, the number of error-correction bits, and the total number of error-correction bits are stored concurrently with the operation shown in FIG. 6.

The procedure shown in FIG. 6 starts with a notification from the timer of starting a fluctuation analyzing cycle as a trigger.

First, the access control unit 101 performs a process of extracting and storing an information element (step S200). Here, the information element is a piece of information reflecting the state of the communication medium, and can be obtained as a result of packet transmission. The information element according to the second embodiment is a piece of information indicative of packet reception quality. In order to reduce a processing load on the communication terminal, the information element is preferably a piece of information that can be easily calculated. In the second embodiment, as the information element, an error correction rate is used for indicating the packet reception quality. Note that the information element described herein is merely an example, and is not meant to be restrictive as long as it is a piece of information indicative of the packet reception quality.

Specifically, in step S200, the access control unit 101 calculates an error correction rate based on the total reception-packet bit length and the total number of error-correction bits at the time of starting a fluctuation analyzing cycle, and then causes the calculated rate to be stored in the reception buffer 103. For example, the error correction rate is calculated by (the total number of error-correction bits)/(total reception-packet bit length).

Next, the access control unit 101 determines whether the number of received packets is equal to or larger than a predetermined minimum number of packets (step S201). If the number of received packets is not equal to or larger than the predetermined minimum number of packets, the access control unit 101 goes to an operation in step S204. On the other hand, the number of received packets is equal to or larger than the predetermined minimum number of packets, the access control unit 101 goes to an operation in step S202.

In step S202, the access control unit 101 calculates an absolute value of a difference between the error correction rate calculated in the current fluctuation analyzing cycle (first information element) and a minimum value among previous error correction rates (second information element: hereinafter referred to as a minimum error correction rate) as a difference value in the error correction rate to determine whether the difference value in the error correction rate is equal to or larger than a predetermined threshold of the difference value in the error correction rate. Here, the minimum error correction rate is not set in the first fluctuation analyzing cycle, and therefore is 0. In any of the following fluctuation analyzing cycles, the value set in step S204, which will be described further below, is used as the minimum error correction rate.

If the difference value in the error correction rate is not equal to or larger than a predetermined threshold of the difference value in the error correction rate, the access control unit 101 goes to an operation in step S204. On the other hand, if the difference value in the error correction rate is equal to or larger than a predetermined threshold of the difference value in the error correction rate, the access control unit 101 goes to an operation in step S203.

In step S203, the access control unit 101 determines that the communication-medium-characteristic detecting scheme is to be performed, and then transmits an evaluation-series request packet to the communication terminal at the transmitting side. In response, the communication terminal at the transmitting side transmits an evaluation-series packet. Then, the communication terminal at the receiving side transmits an evaluation-result packet to the communication terminal at the transmitting side. With this, the communication-medium-characteristic detecting scheme is performed. After the operation in step S203, the access control unit 101 goes to the operation in step S204.

In step S204, the access control unit 101 restores a minimum value among previous error correction rates in the reception buffer 103 as the minimum error correction rate.

The operations in steps S200 through S204 are performed from the start of the fluctuation analyzing cycle and the end thereof. After the operations in steps S200 through S204 are completed, the access control unit 101 waits until the time of starting the next fluctuation analyzing cycle arrives to start the operation shown in FIG. 6.

Figure 7:
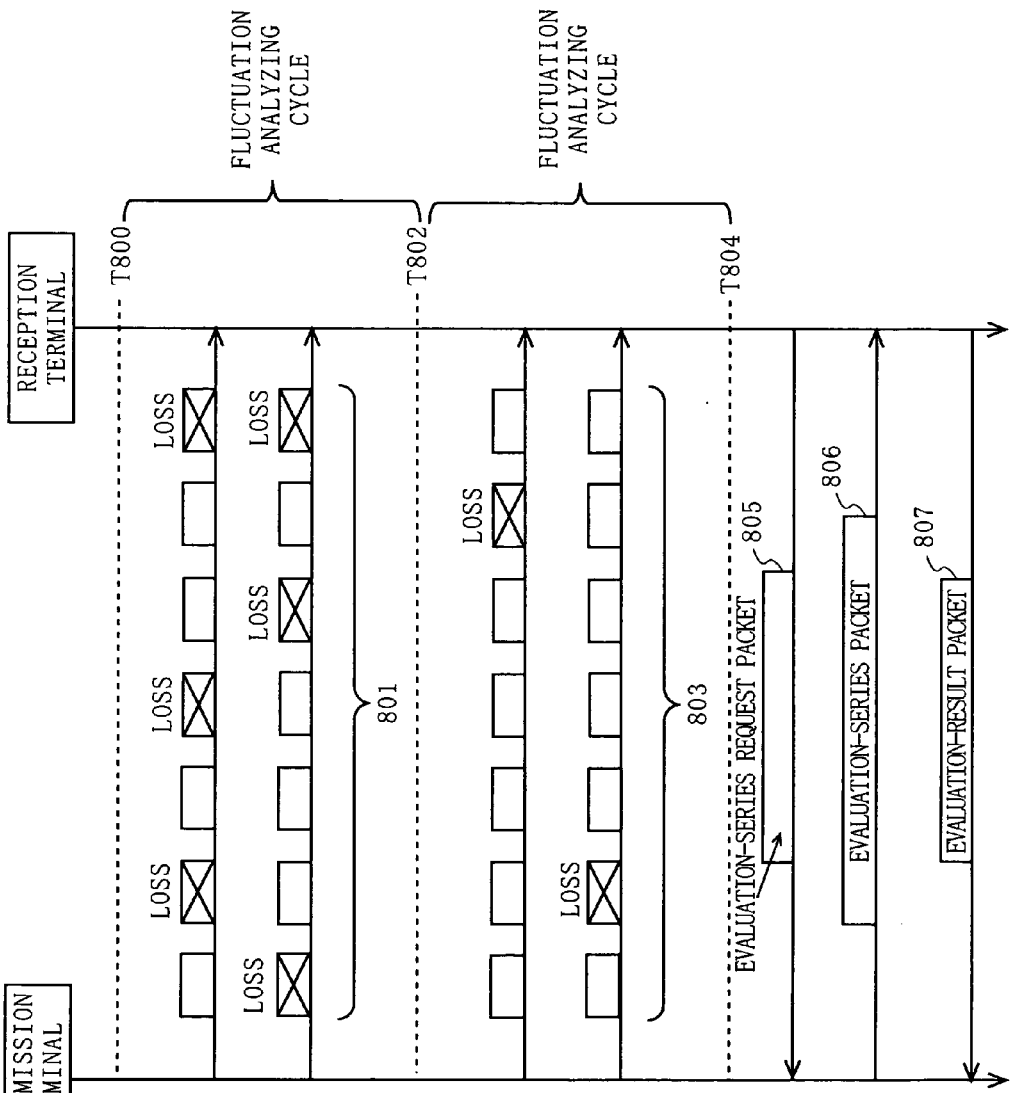
FIG. 7 is a sequence diagram for describing an example of timings of performing a communication-medium-characteristic detecting scheme when the state of the communication medium is changed from a deteriorated state to an improved state.

FIG. 7 is a sequence diagram for describing an example of timings of performing the communication-medium-characteristic detecting scheme when the state of the communication medium is changed from a deteriorated state to an improved state. Hereinafter, with reference to FIG. 7, description is made to the example of timings of performing the communication-medium-characteristic detecting scheme when the state of the communication medium is changed from a deteriorated state to an improved state.

Firstly, it is assumed that, when a time T800 for starting a fluctuation analyzing cycle arrives, the transmission terminal has already transmitted a plurality of packets as a date sequence 801.

Next, it is assumed that the state of the communication medium is improved at a time T802 for starting another fluctuation analyzing cycle and thereafter. In this case, the error correction rate is decreased, and therefore the difference value in the error correction rate can be equal to or larger than the threshold of the difference value in the error correction rate. At a time T804 for starting still another fluctuation analyzing cycle, upon determination that the difference value in the error correction rate is equal to or larger than the threshold of the difference value in the error correction rate (refer to a flow to YES in step S202 of FIG. 6), the reception terminal transmits an evaluation-series request packet 805 to the transmission terminal. In response, the transmission terminal returns an evaluation-series packet 806 to the reception terminal. Based on the evaluation-series packet 806, the reception terminal calculates an index of modulation for each sub-carrier, stores the calculated indexes in an evaluation-result packet 807, and then transmits the packet to the transmission terminal. Based on the evaluation-result packet 807, the transmission terminal changes the communication parameter. With this, the process of performing the communication-medium-characteristic detecting scheme is completed. After the communication-medium-characteristic detecting scheme is performed, the reception terminal compares the minimum error correction rate of the data sequence 802 and the minimum error correction rate, and then updates the minimum error correction rate to the error rate that is smaller of the above two.

As such, the communication terminal according to the second embodiment compares the difference in an information element indicative of the packet reception quality, such as the error correction rate, with a predetermined threshold value. Therefore, the communication terminal can detects whether the reception quality is changed to a predetermined degree or more. In the communication terminal according to the second embodiment, in addition to the phenomenon that the communication-medium characteristic is deteriorated, a phenomenon that the communication-medium characteristic is improved can also be detected. Therefore, in the communication terminal according to the second embodiment, even if the state of the communication medium is changed from a deteriorated state to an improved state, the communication parameter can be made so as to suitably follow the state of the communication medium. Therefore, it is possible to provide a communication terminal allowing an improvement in throughput in the entire communication system and a reduction in time taken from the time when the state of the communication medium is fluctuated to the time when the communication parameter is changed.

Here, in the second embodiment, the information element, such as the error correction rate, is calculated at the start of the fluctuation analyzing cycle (refer to step S200 in FIG. 6). Alternatively, such calculation is performed in a step of comparing a difference value with a threshold (step S202 in FIG. 6).

Also, the access control unit 101 may calculate the error correction rate whenever it performs an error correcting process on the received packet. In this case, the calculated error correction may be stored in the reception buffer 103, and when the process in FIG. 6 is performed, the access control unit 101 extracts the latest error correction rate stored and the minimum error correction rate to calculate an absolute value of a difference therebetween, thereby calculating the difference value in the error correction rate.

Furthermore, in the first embodiment, in order to calculate a difference value in error correction rate, an absolute value of a difference between the error correction rate calculated in the current fluctuation analyzing cycle and a minimum ratio of occurrence of retransmission is calculated. Alternatively, an absolute value of a difference between the error correction rate calculated in the current fluctuation analyzing cycle and an error correction rate calculated in the previous fluctuation analyzing cycle may be taken as the difference value in the error correction rate. Also, the error correction rate calculated in the previous fluctuation analyzing cycle is not restricted to an error correction rate calculated in the immediately-previous fluctuation analyzing cycle as long as it is an error correction rate calculated in any one of previous fluctuation analyzing cycles.

Still further, also in the second embodiment, as shown in the first embodiment, whether the communication-medium-characteristic detecting scheme may be performed at the transmission terminal side for performing the communication-medium-characteristic detecting scheme as required.

Still further, in the first and second embodiments, the fluctuation analyzing cycles are constant, but may be variable. If the fluctuation analyzing cycles are constant and a plurality of terminals are present on the network, there is a high possibility that times for starting a fluctuation analyzing cycle may be overlapped each other. Consequently, the communication-medium-characteristic detecting scheme may possibly be performed by the plurality of communication terminals at the same time. Therefore, the fluctuation analyzing cycles are changed in a random manner or the fluctuation analyzing cycle for each communication terminal is updated by a specific algorithm, thereby preventing such a possibility that the communication-medium-characteristic detecting scheme is performed by the plurality of communication terminals at the same time. Also, if the communication parameter is little changed even with the execution of the communication-medium-characteristic detecting scheme, that is, if the communication speed is little changed, the fluctuation analyzing cycle may be changed to be extended. With the fluctuation analyzing cycle being extended, the number of calculation of the information element and the number of determinations are reduced, thereby decreasing a processing load on the communication terminal required for calculation and determination of the information element.

Still further, in the first or second embodiment, the communication-medium-characteristic detecting scheme may be performed on condition that the ratio of occurrence of retransmission or the error correction rate is continuously within a predetermined value range for a predetermined period. In the case where the state of communication medium is in a satisfactory state to some extent from the start, the ratio of occurrence of retransmission or the error correction rate can be approximated to 0. Therefore, in the first or second embodiment, if the state is further improved, a difference in the ratio of occurrence of retransmission or in the error correction rate cannot be used for estimating the state of the communication medium. In order to cope with this problem, as an modification of the first or second embodiment, the communication-medium-characteristic detecting scheme may be performed when the ratio of occurrence of retransmission or the error correction rate is continuously within a predetermined range for a predetermined period. With this, the communication-medium-characteristic detecting scheme is performed even when the state of the communication medium is in a satisfactory state to some extent, thereby allowing the communication parameter to be more suitably set.

Still further, for multi-carrier transmission, timings of performing the communication-medium-characteristic detecting scheme may be determined by estimating the state of the communication medium based on fluctuations of a difference in an information element, such as an intensity of electric power in the entire occupied frequency or a level of a received signal for correcting a preamble.

(Third Embodiment)

In a third embodiment, the structure of a communication terminal is similar to that according to the first embodiment. Therefore, FIG. 1 is also referred to.

In a communication system, such as a wireless LAN or a power-line communication, interference among transmission packets cannot be detected. Therefore, normally, a reception terminal returns information indicative of a success or failure of packet transmission as an ACK packet. With this, interference among transmission packets is detected.

Figure 8:
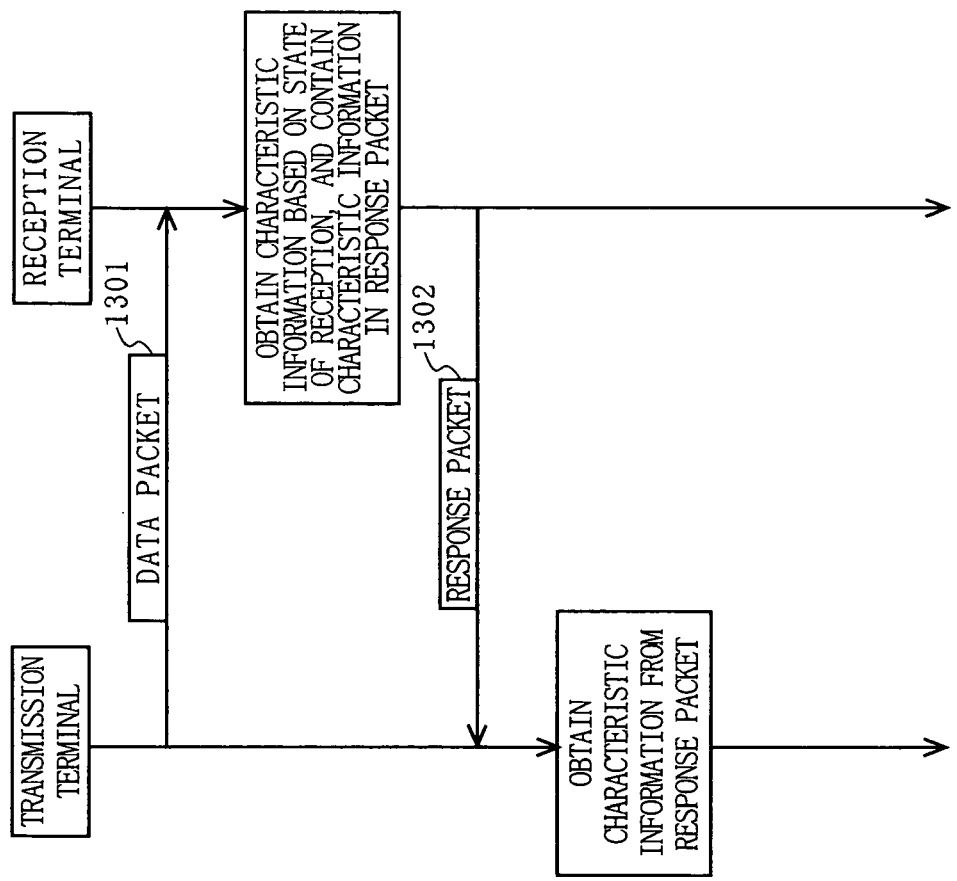
FIG. 8 is a sequence diagram showing a flow of processing between a transmission terminal and a reception terminal according to a third embodiment of the present invention.

FIG. 8 is a sequence diagram showing a flow of processing between a transmission terminal and a reception terminal according to the third embodiment of the present invention. As shown in FIG. 8, the transmission terminal transmits a data packet 1301 to the reception terminal. Based on the state of reception of the data packet 1301, the reception terminal obtains characteristic information, contains the characteristic information in an ACK packet 1302, and then transmits the ACK packet to the transmission terminal. The transmission terminal then obtains the characteristic information from the received ACK packet 1302 to determine whether to perform the communication-medium-characteristic detecting scheme. Here, as the characteristic information, the number of error correction bits indicating a size of the reception packet required for error correction is used. Also, a CINR (Carrier to Interference and Noise power Ratio) value is used, which is obtained by the reception terminal regarding a part of a transmitted data packet as an evaluation series. As such, the characteristic information is information indicative of packet reception quality obtained as a result of evaluating the characteristic of the communication medium.

The CINR value has a theoretical correlation with a bit error rate. Therefore, fluctuations in the state of the communication medium can be estimated with an increase or decrease in the CINR value. FIG. 9A is an illustration showing one example of a data packet format of a data packet partially containing a portion assumed to be an evaluation series. As shown in FIG. 9A, the entire packet header may be taken as an evaluation series. FIG. 9B is an illustration showing another example of the data packet format of a data packet partially containing a portion assumed to be an evaluation series. As shown in FIG. 9B, an evaluation series may be present between a packet header and data body.

A data pattern of the evaluation series in the third embodiment is similar to a data pattern contained in the evaluation-series packet transmitted with each basic cycle, and can be commonly used between the transmission terminal and the reception terminal. As with the convention technologies, which sub-carrier is used is predetermined for each portion of data in the evaluation series. Therefore, the reception terminal can evaluate the CINR for each sub-carrier as to the evaluation series transmitted from the transmission terminal. The reception terminal causes a total value of CINRs for the respective sub-carriers as a CINR value to be contained in an ACK packet for transmission to the transmission terminal. With this, the transmission terminal can detect the state of the communication medium.

However, the evaluation series in the third embodiment is small in size so as not to decrease the throughput compared with the evaluation series transmitted with each basic cycle. This is because, the use of an evaluation series of approximately the same size as that of the evaluation series transmitted with each basic cycle, the throughput is decreased.

If the evaluation series is short, merely an instantaneous CINR while the state of the communication medium can be obtained and evaluated. On the other hand, if the evaluation series is long, CINRs can be obtained over a long period of time, and therefore an average value of the CINRs for a certain period of time can be obtained. If the communication-medium characteristic is locally observed, the CINR cannot be accurately evaluated for a certain period of time only with evaluation of an instantaneous CINR because the characteristic is unstably fluctuated. Therefore, compared with the case where the evaluation series is long, the accuracy of the CINR is low when the evaluation series is short. Hereinafter, an evaluation series transmitted with each basic cycle is referred to as a normal evaluation series, while an evaluation series having a small size to be contained in a transmission packet is referred to as a simple evaluation series.

The inventors used data of 128 symbols per sub-carrier as a normal evaluation series, while using data of 4 symbols per sub-carrier as a simple evaluation series. Therefore, the simple evaluation series is data having a short length so as to be contained in a packet header as shown in FIG. 9A, and therefore does not decrease the throughput. Also, if this data is contained in a manner as shown in FIG. 9B, this does not lead to a decrease in throughput.

As will be described further below, according to the third embodiment, the simple evaluation series contained in a transmission packet is smaller in size than the evaluation series transmitted with each basic cycle. Therefore, the CINR that can be obtained by the reception terminal through the simple evaluation series is low in accuracy. Therefore, such a CINR with low accuracy is contained in an ACK packet, and is then transmitted to the transmission terminal. However, the transmission terminal sums CINRs with low accuracy from ACK packets to obtain an average value as an information element, and uses a difference in the average value of CINRs to detect a fluctuation of the communication-medium characteristic. Therefore, even though the transmission terminal uses the CINRs with a low accuracy, a fluctuation in communication-medium characteristic can be detected.

A packet header portion is a portion transmitted at the lowest communication speed and through the most redundant modulation scheme so as to be detected by all terminal in the communication system. Therefore, as shown in FIG. 9A, when the packet header portion is regarded as the evaluation series, CINR detection can be achieved with relatively high accuracy. Particularly for DMT, an average power of sub-carriers in the packet header portion is constant, and therefore the packet header is suitable for being regarded as an evaluation series.

Here, the CINR value is characteristic value indicative of an average value of CINRs for all sub-carriers. In the third embodiment, as the CINR value, a total number of bits that can be transmitted per symbol block is used, which is calculated by evaluating a CINR for each sub-carrier. That is, an amount of data that can be transmitted per symbol block is used.

Also, as the characteristic information, an SINR (Signal to Interference pulse Noise Ratio) value may be used instead of the CINR value. Furthermore, as the characteristic information, a received signal intensity indicative of a reception intensity of the received packet may be used.

The transmission terminal receives an ACK packet from the reception terminal to obtain the embedded characteristic information. The access control unit 101 of the transmission terminal sums the number of error bits and the CINR values, which are the obtained characteristic information, whenever receiving an ACK packet. Also, the access control unit 101 sums transmission data lengths and the number of transmissions. The access control unit 101 stores a total number of correction bits, a total CINR value, a total transmission data length, and the number of transmissions in the transmission buffer 102 in a format in which they are associated with the transmission queue 102a for each destination.

Figure 10:
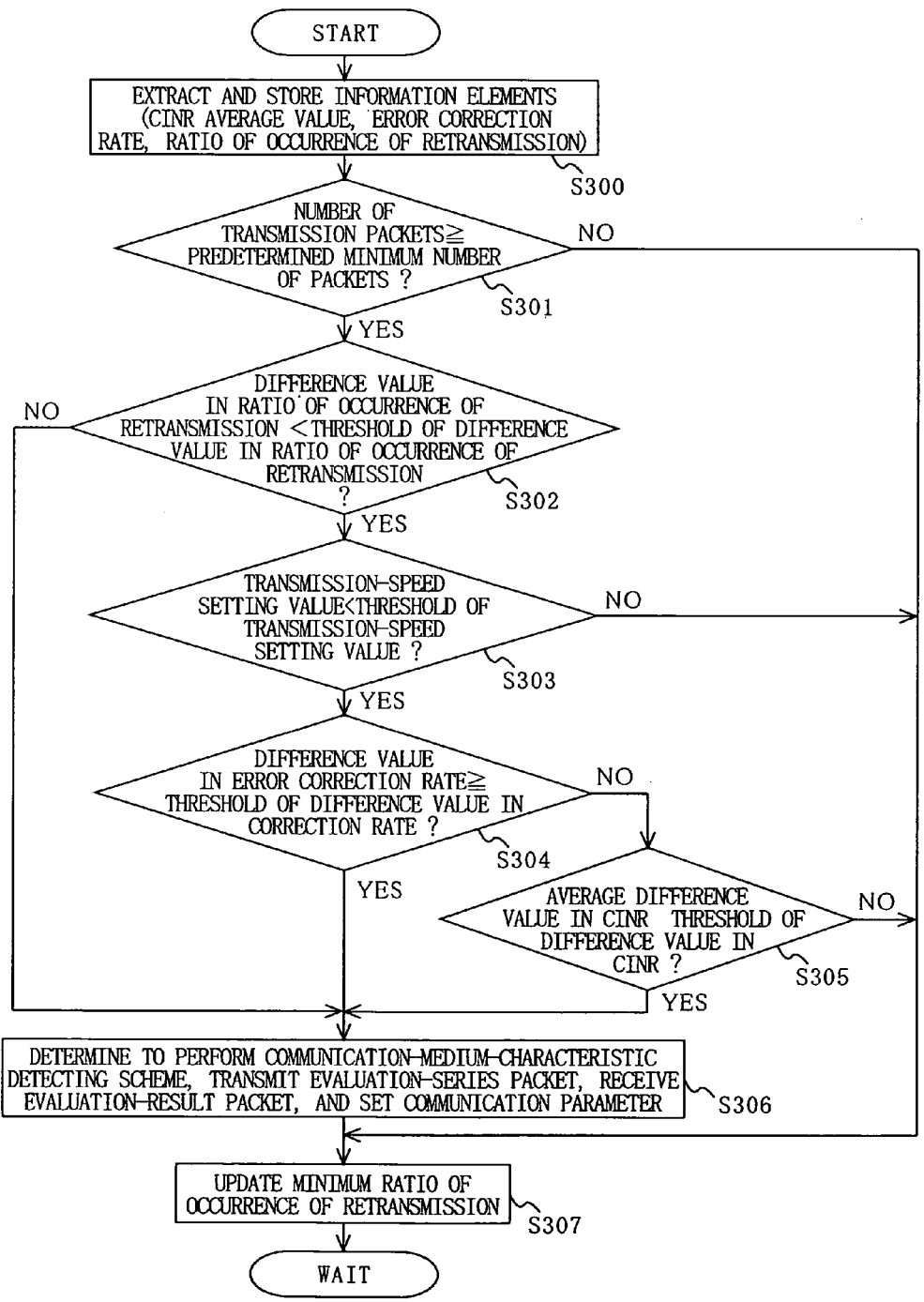
FIG. 10 is a flowchart showing the operation of the access control unit 101 of a transmission terminal according to a third embodiment in a fluctuation analyzing cycle.

FIG. 10 is a flowchart showing the operation of the access control unit 101 of the transmission terminal according to the third embodiment in a fluctuation analyzing cycle. In the third embodiment, unless otherwise mentioned, the access control unit 101 is assumed to refer to the access control unit 101 in the transmission terminal. Also, packet reception and demodulation are performed concurrently with the operation shown in FIG. 10. Therefore, the total number of correction bits, the total CINR value, the total transmission data length, and the number of transmissions are stored concurrently with the operation shown in FIG. 10.

The procedure shown in FIG. 10 starts with a notification from the second timer of starting a fluctuation analyzing cycle as a trigger.

First, a process of extracting and storing an information element is performed (step S300). Here, the access control unit 101 divides the total number of correction bits by the total transmission data length to calculate an error correction rate. Also, the access control unit 101 divides the total CINR value by the number of transmissions to calculate an average value of the CINR values (hereinafter, an average CINR value). Furthermore, as with the first embodiment, the access control unit 101 calculates a ratio of occurrence of retransmission. The access control unit 101 takes the error correction rate, the average CINR value, and the ratio of occurrence of retransmission as information elements. As such, the information elements are pieces of information reflecting the state of the communication medium, and can be obtained as a result of packet transmission. The information elements according to the third embodiment are pieces of information indicative of packet transmission efficiency or reception quality. In order to reduce a processing load on the communication terminal, the information elements are preferably pieces of information that can be easily calculated.

As described above, the simple evaluation series is shorter than the normal evaluation series transmitted with each basic cycle. Therefore, with one evaluation, only the CINR value with a low accuracy can be obtained. However, by summing and averaging the CINR values, a CINR value with a high accuracy can be resultantly obtained.

Next, the access control unit 101 determines in a manner similar to that of the first embodiment whether the number of transmission packets is equal to or larger than a predetermined minimum number of packets (step S301). If the number of transmission packets is not equal to or larger than the predetermined minimum number of packets, the access control unit 101 goes to an operation in step S307. On the other hand, if the number of transmission packets is equal to or larger than the predetermined minimum number of packets, the access control unit 101 goes to an operation in step S302. Here, as with the first embodiment, it is assumed that the access control unit 101 stores, for each timing of transmitting a packet, the number of packets in the transmission buffer 102.

In step S302, as with the first embodiment, the access control unit 101 determines whether the difference value in the ratio of occurrence of retransmission is smaller than a threshold of the difference value in the ratio of occurrence of retransmission. If the value is not smaller than the threshold of the difference value in the ratio of occurrence of retransmission, the access control unit 101 goes to an operation in step S306. IF the value is smaller than the threshold of the difference value in the ratio of occurrence of retransmission, the access control unit 101 goes to an operation in step S303.

In step S303, as with the first embodiment, the access control unit 101 determines whether the transmission-speed setting value is smaller than a threshold of the transmission-speed setting value. If the value is not smaller than the threshold of the transmission-speed setting value, the access control unit 101 goes to the operation in step S307. On the other hand, if the value is smaller than the threshold of the transmission-setting value, the access control unit 101 goes to an operation in step S304.

In step S304, the access control unit 101 calculates an absolute value of a difference between the error correction rate calculated in the current fluctuation analyzing cycle (first information element) and an error correction rate calculated in the previous fluctuation analyzing cycle (second information element) as a difference value in the error correction rate, and then determines whether the difference value in the error correction rate is equal to or larger than a threshold of the difference value in the error correction rate. Note that, as long as a difference from an error correction rate that was calculated in any of previous fluctuation analyzing cycles is calculated, the difference is not restricted to the difference from the error correction rate that was calculated in the immediately-previous fluctuation analyzing cycle.

If the difference value in the error correction rate is equal to or larger than the threshold of the difference value in the error correction rate, the access control unit 101 goes to the operation in step S306. On the other hand, if the difference value in the error correction rate is not equal to or larger than the threshold of the difference value in the error correction rate, the access control unit 101 goes to an operation in step S305.

In step S305, the access control unit 101 calculates an absolute value of a difference between an average CINR value calculated in the current fluctuation analyzing cycle (first information element) and an average CINR value calculated in the previous fluctuation analyzing cycle (second information element) as an average CINR difference value, and then determines whether the average CINR difference value is equal to or larger than a threshold of the CINR difference value. Note that, as long as a difference from an average CINR value calculated in any of previous fluctuation analyzing cycles is calculated, the difference is not restricted to the difference from the average CINR value was calculated in the immediately-previous fluctuation analyzing cycle.

If the average CINR difference value not is equal to or larger than the threshold of the CINR difference value, the access control unit 101 goes to the operation in step S307. On the other hand, if the average CINR difference value is equal to or larger than the threshold of the CINR difference value, the access control unit 101 goes to the operation in step S306.

In step S306, the access control unit 101 determines that the communication-medium-characteristic detecting scheme is to be performed, transmits an evaluation-series packet to the communication terminal at the receiving side and, based on an evaluation-result packet returned in response, resets the communication parameter. Then, the access control unit 101 goes to the operation in step S307.

In step S307, the access control unit 101 updates a minimum value of the ratio of occurrence of retransmission.

The operations in step S300 through S307 are performed during the fluctuation analyzing cycle. Upon completion of the processing, the access control unit 101 waits until the time of starting the next fluctuation analyzing cycle arrives to start the operation shown in FIG. 10.

As such, according to the third embodiment, the transmission terminal causes a simple evaluation series, which does not lead to a reduction in throughput, to be contained in a packet for transmission to the reception terminal. Based on the simple evaluation series contained in the received packet, the reception terminal obtains a CINR value as the characteristic information of the communication medium. Also, the reception terminal obtains the number of error correction bits of the received packet as the characteristic information of the communication medium. The reception terminal causes the characteristic information (CINR value, the number of error correction bits) to be contained in an ACK packet for transmission to the transmission terminal. Based on the CINR value and the number of error correction bits, which is the characteristic information contained in the ACK packet, the transmission terminal calculates an error correction rate and an average CINR value, which are information elements. Also, the transmission terminal calculates a ratio of occurrence of retransmission as an information element. The transmission terminal then compares a difference in each of the information elements (the error correction rate, the average CINR value, and the ratio of occurrence of retransmission) with a predetermined threshold. Therefore, the transmission terminal can detect whether a fluctuation has occurred to a predetermined degree or more in packet transmission efficiency or reception quality. In conventional technology, the fact that the number of retransmissions is increased merely tells a phenomenon that the communication-medium characteristic is deteriorated. In the communication terminal according to the third embodiment, in addition to the phenomenon that the communication-medium characteristic is deteriorated, a phenomenon that the communication-medium characteristic is improved can also be detected. Therefore, in the communication terminal according to the third embodiment, even if the state of the communication medium is changed from a deteriorated state to an improved state, the communication parameter can be made so as to suitably follow the state of the communication medium. Therefore, it is possible to provide a communication terminal allowing an improvement in throughput in the entire communication system and a reduction in time taken from the time when the state of the communication medium is fluctuated to the time when the communication parameter is changed.

Also, in the reception terminal, the number of error correction bits and the CINR are information that is easy to obtain. Therefore, a processing load on the reception terminal is not increased. In addition, the characteristic information (the number or error correction bits and the CINR) is contained in an ACK packet, which is always required to be transmitted, or a short evaluation series (simple evaluation series) is contained in a part of a transmission packet. Therefore, the processing according to the third embodiment does not increase the throughput. Furthermore, the throughput is not increased because of the transmission of the evaluation-series request packet from the reception terminal.

Furthermore, in the third embodiment, an average CINR value and an error correction rate calculated based on the CINRs and the number of error correction bits are used as the information elements. Therefore, it can be expected that fluctuations in the state of the communication medium is more accurately detected. Also, it can be expected that the communication parameter can be caused to follow fluctuations in the state of the communication medium more accurately.

Still further, in the third embodiment, the access control unit 101 calculates, as the difference value in the error correction rate, an absolute value of a difference between the error correction rate calculated in the current fluctuation analyzing cycle and the error correction rate calculated in the previous fluctuation analyzing cycle. Alternatively, an absolute value of a difference between the error correction rate calculated in the current fluctuation analyzing cycle and a minimum error correction value until the previous fluctuation analyzing cycle may be calculated as the difference value in the error correction rate. In this case, the minimum value is updated in step S307 of FIG. 10.

Still further, in the third embodiment, the access control unit 101 calculates, as the average CINR difference value, an absolute value of a difference between the average CINR value calculated in the current fluctuation analyzing cycle and the average CINR value calculated in the previous fluctuation analyzing cycle. Alternatively, an absolute value of a difference between the average CINR value calculated in the current fluctuation analyzing cycle and a minimum average CINR value until the previous fluctuation analyzing cycle may be calculated as the average CINR difference value. In this case, the minimum value is updated in step S307 of FIG. 10.

Still further, the access control unit 101 may calculate and retain a CINR value at the time of receiving the evaluation-series packet, and then may calculate an absolute value of a difference between the average CINR value calculated in the current fluctuation analyzing cycle and a CINR value obtained at the previous time of performing the communication-medium-characteristic detecting scheme as the average CINR difference value. This is because, if the accuracy of the average CINR value is high, the CINR value obtained through the communication-medium-characteristic detecting scheme and the average CINR value can be compared to detect fluctuations in the communication-medium characteristic.

Here, whenever storing the information required for calculating the information elements (the average CINR value, the error correction rate, and the ratio of occurrence of retransmission), the access control unit 101 may calculate the information elements for storage. In this case, the access control unit 101 extracts the stored information elements with each fluctuation analyzing cycle to determine whether the communication-medium-characteristic detecting scheme is to be performed.

Also, when the SINR value and the reception signal intensity are used as the characteristic information, the access control unit 101 may extract an average SINR value or an average reception signal intensity, compare its difference with a threshold, and then determine whether the communication-medium-characteristic detecting scheme is to be performed.

Still further, the order of steps S301, S302, S303, S304, and S305 in FIG. 10 may be partially interchanged.

Particularly, either one of steps S304 and S305 may be performed first of these two.

Still further, step S302 is typically to detect a deterioration in the state of the communication medium. Therefore, if detection of improvement in the state of the communication medium, the operation in step S304 or S305 is performed prior to the operation in step S302.

Still further, step S303 is to prevent the communication rate from being fixed to a low rate, and also to suppress the frequency of unnecessary performance of the communication-medium-characteristic detecting scheme at a high, to a degree, communication rate. Alternatively, the threshold of the difference in the correction rate and the threshold of the difference in the CINR value are set to be small, and the operation in step S303 may be omitted.

Still further, the process in step S301 for determining whether the number of packets is equal to or larger than the minimum number of packets is not necessarily required.

Still further, the threshold of the difference in the error correction rate may be changed according to the current transmission-speed setting value. The communication parameter set under the circumstances where the state of the communication medium is deteriorated is different from the communication parameter set under the circumstances where the state of the communication medium is satisfactory in a width of fluctuations in the error correction rate due to fluctuations in the state of the communication medium. The communication parameter set under the circumstances where the state of the communication medium is deteriorated is always error-resistant, highly-redundant communication parameter. Therefore, if the communication parameter has been set under the circumstances where the state of the communication medium is deteriorated, even if the state of the communication medium is improved, the difference in fluctuations in the error correction rate is small compared with the communication parameter set under the circumstances where the state of the communication medium is satisfactory. Therefore, if the transmission-speed setting value is high, the threshold of the difference in the error correction rate is changed to be high, and if the transmission-speed setting value is low, the threshold of the difference in the error correction rate is changed to be low.

According to the first through third embodiments, even if the communication-medium-characteristic detecting scheme is not being performed, the communication parameter can be set with each basic cycle so as to follow the state of the communication medium. However, in the first through third embodiments, the threshold of the transmission-speed setting threshold is provided. Therefore, even if the state of the communication medium is continuously satisfactory for a long period, it is not possible to cause the communication parameter to follow that state of the communication medium. This is a reason for performing the communication-medium-characteristic detecting scheme with each basic cycle.

Note that the above-described embodiments also can be realized by causing a computer to implement a program which is able to cause the CPU to implement the above-described process procedures stored in a storage device (e.g., a ROM, a RAM, a hard disk, etc.) In such a case, the program may be implemented after it is stored into the storage device via a recording medium, or may be implemented directly from the recording medium. The term "recording medium" as described herein refers to a ROM, a RAM, a semiconductor memory, such as a flash memory, a magnetic disc memory, such as a flexible disc, a hard disk, etc., an optical disc, such as a CD-ROM, a DVD, or a blue-ray disc (BD), etc., or a memory card. The term "recording medium" as described herein also refers to a communication medium including a telephone line, a carrier path, etc.

Note that the access control unit 101 may be realized as a large-scale integrated(LSI)circuit. This functional blocks may be implemented as a single chip which includes a part or all of it. The LSI circuit may be selected from the group consisting of integrated circuits of various degrees of integration, e.g., an IC, a system LSI, a super LSI, an ultra LSI, etc. Further, a technique used for realizing circuit integration as described above is not limited to an LSI technique, and the integrated circuit as described above may be realized using a specialized circuit or a general-purpose processor. It is also possible to use a field programmable gate array (FPGA), which can be programmed after manufacture, or a reconfigurable processor which is structured such that connections of circuit cells thereof and its settings can be reconfigured. Furthermore, in the event of introduction of anew circuit integration technique, in place of the LSI technique, due to the advance of semiconductor technology or other relevant technologies, the above-described functional blocks may be integrated using such a new technique. It is conceivable that biotechnology or the like is applied to integration of the functional blocks.

Figure 11:
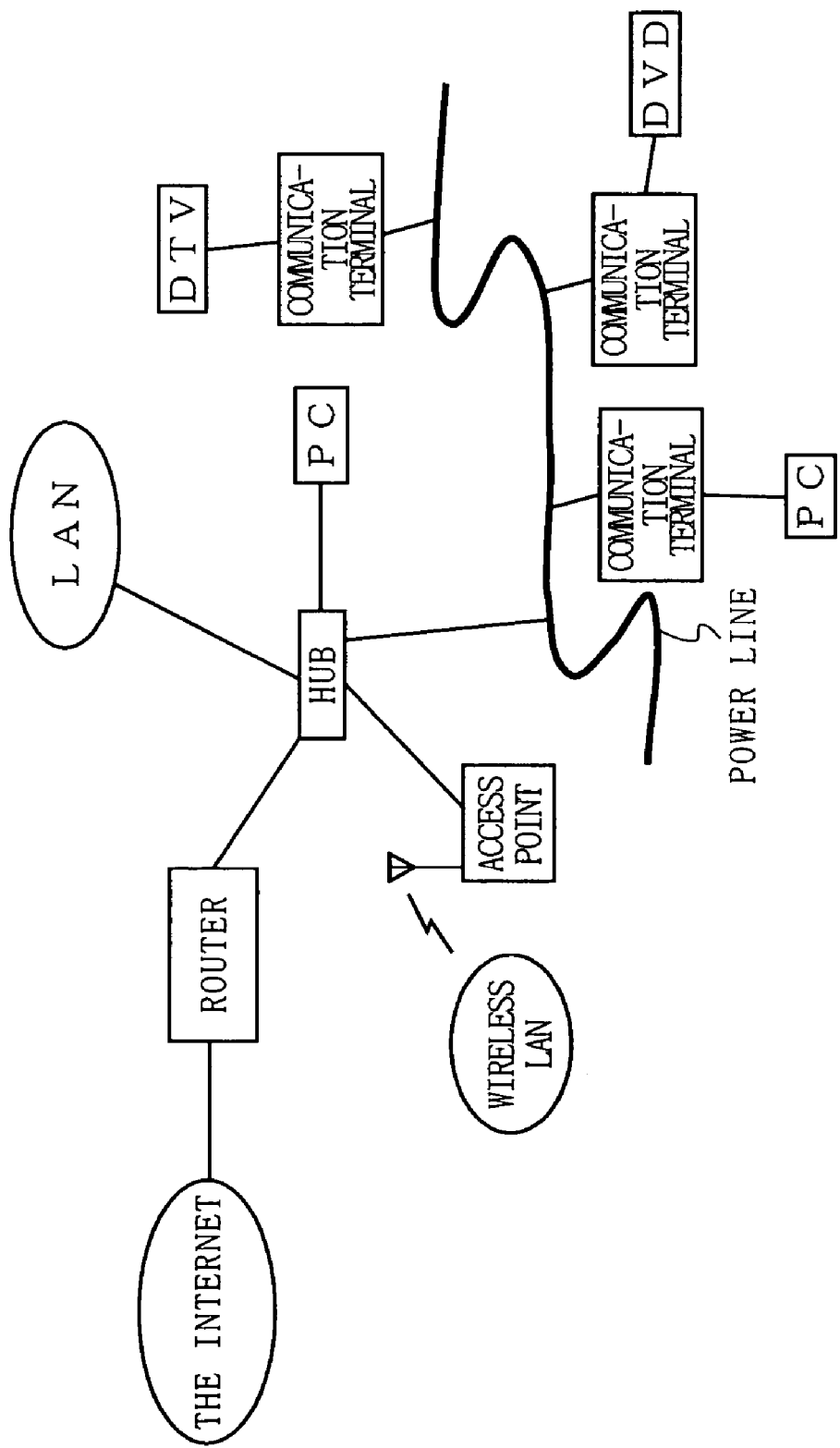
FIG. 11 is an illustration showing the entire system configuration when the communication terminal according to the present invention is applied to high-speed power line transmission.
Figure 12:
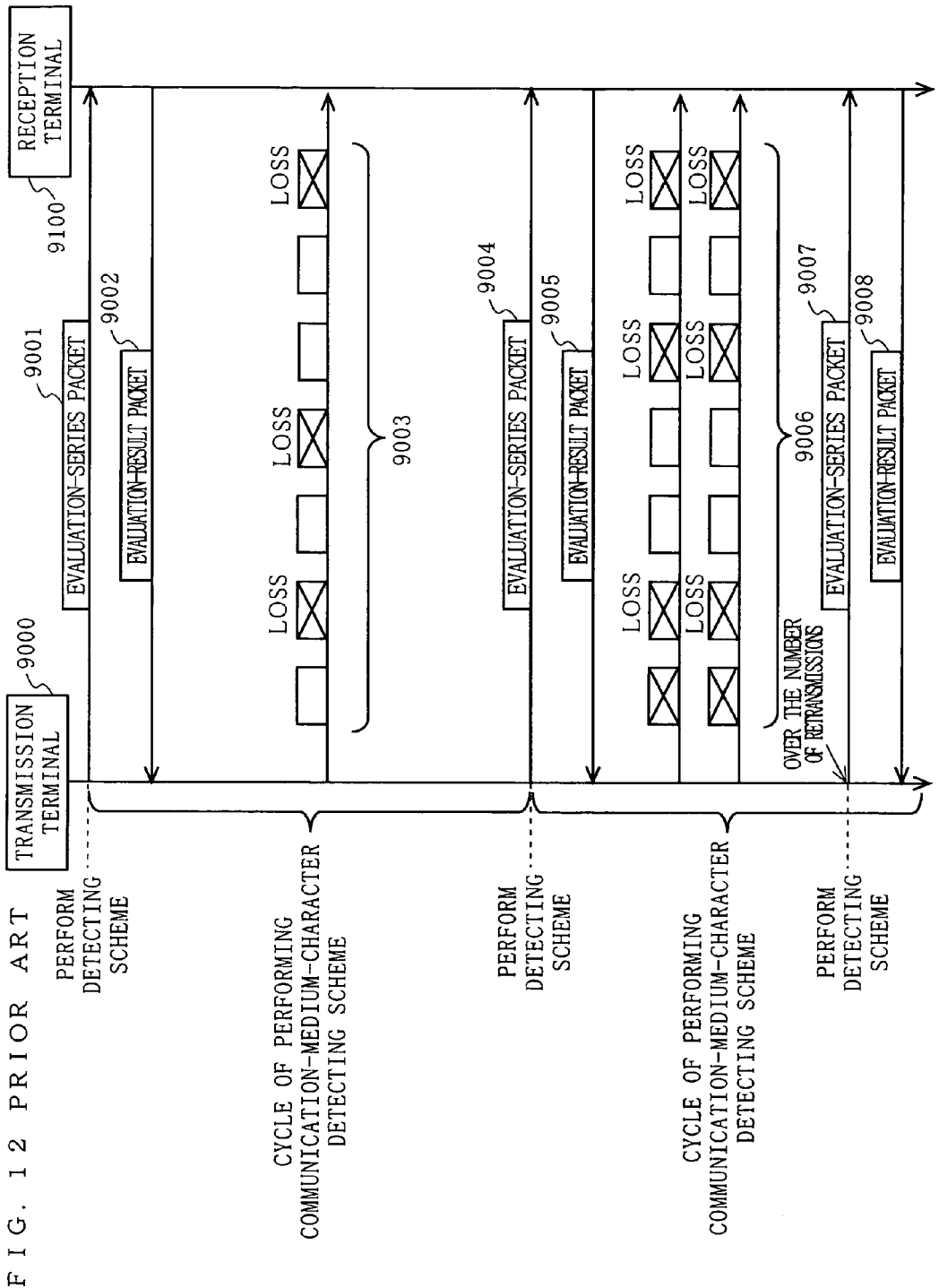
FIG. 12 is a sequence diagram showing a conventional method of determining timings of performing a communication-medium-characteristic detecting scheme independently from a characteristic unique to a communication medium.
Figure 13:
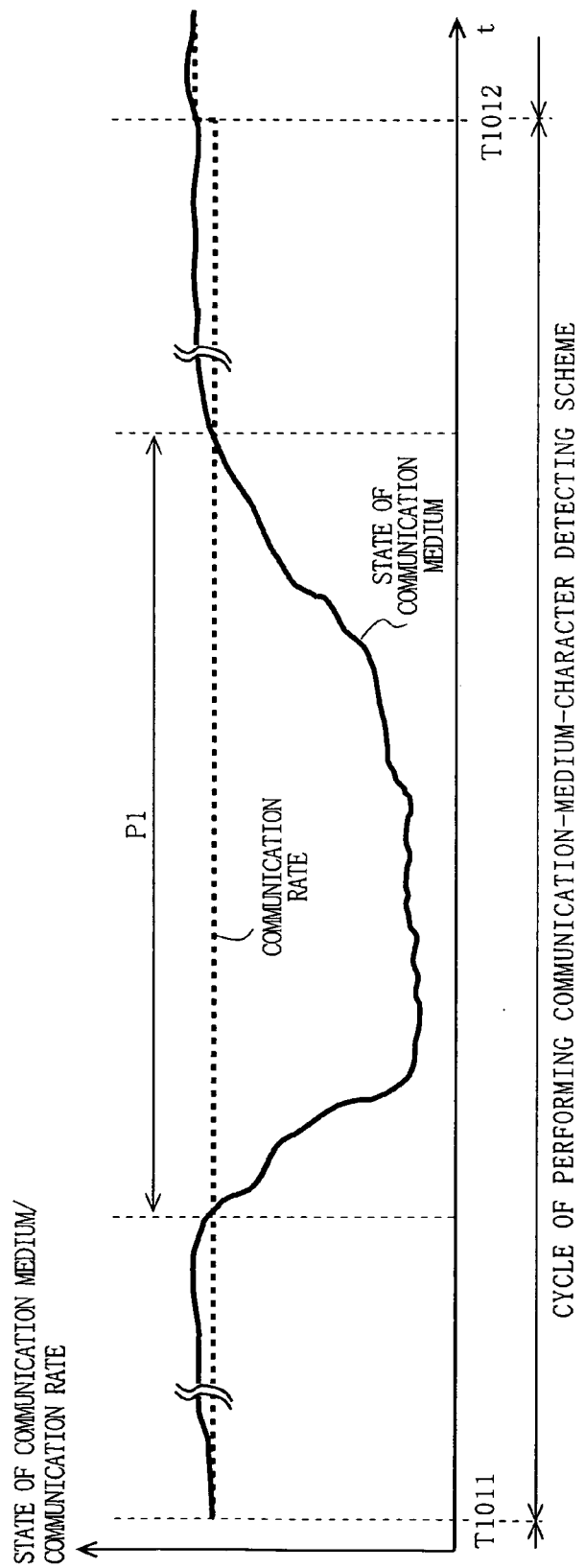
FIG. 13 is a graph showing a relation between a communication rate and a state of a communication medium in a conventional case where the communication-medium-characteristic detecting scheme is cyclically operated.
Figure 14:
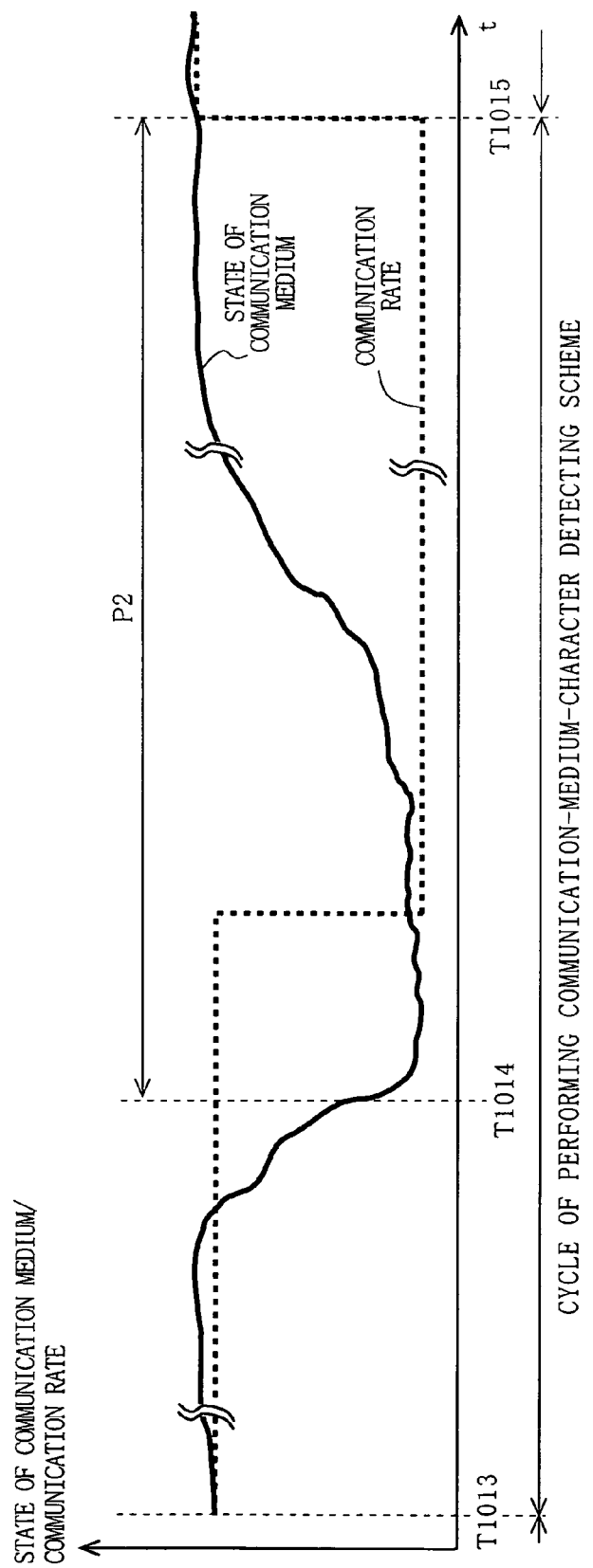
FIG. 14 is a graph showing a relation between a communication rate and a state of a communication medium in a conventional case where the communication-medium-characteristic detecting scheme is performed when the number of packet retransmissions exceeds a predetermined value.

Described below is an example of applying the above embodiments to an actual network system. FIG. 11 is an illustration showing the entire system configuration when the communication terminal according to the present invention is applied to high-speed power line transmission. As shown in FIG. 11, the communication terminal of the present invention is provided as an interface between a multimedia apparatus, such as a digital television (DTV), a personal computer (PC), a DVD recorder, etc., and a power line. The multimedia apparatus may be connected to the communication terminal of the present invention via an IEEE 1394 interface, a USB interface, or an Ethernet interface. With this structure, a communication network system is structured so as to transmit digital data, such as multimedia data, at high speed via the power line as a communication medium. Accordingly, unlike in the case of a conventional wired LAN, it is possible to use a power line previously installed at home, an office, etc., as a network line without providing a network cable anew. Therefore, convenience of such a system is considerably high with respect to cost and ease of installation.

In the example shown in FIG. 11, the communication terminal of the present invention is provided as an adaptor for adapting a signal interface of an existing multimedia apparatus to a power line communication interface. However, the communication terminal of the present invention may be included in a multimedia apparatus, such as a personal computer, a DVD recorder, a digital television, a home server system, etc. This allows data to be transmitted between multimedia apparatuses via their power cords. In this case, it is possible to eliminate a wire for connecting an adaptor to the power line, and an IEEE-1394 cable or a USB cable, thereby simplifying system wiring.

Further, in a communication network system using the power line, connection to the Internet, a wireless LAN, or a conventional wired LAN can be made via a router and/or a hub, and therefore there is no difficulty in extending a LAN system which employs the communication network system of the present invention.

Furthermore, communication data transmitted through the power line via power line transmission is not intercepted unless interception is conducted via direct connection to the power line, and therefore there is substantially no data leakage by interception which is a disadvantage of a wireless LAN. Accordingly, the power line transmission is advantageous from the viewpoint of security. It goes without saying that the data transmitted through the power line can be protected by employing security architecture for internet protocol (IPsec), encrypting content itself, or employing other digital rights management (DRM) techniques.

While the invention has been described in detail, the foregoing description is in all aspects illustrative and not restrictive. It is understood that numerous other modifications and variations can be devised without departing from the scope of the invention.

What is claimed is:

1. A communication apparatus for modulating and demodulating a packet based on a communication parameter determined according to a communication-medium characteristic, comprising:

an extracting unit configured to extract, during every occurrence of a predetermined cycle, an information element indicative of packet transmission efficiency, wherein the extracting unit extracts a ratio of occurrence of retransmission as the information element indicative of the packet transmission efficiency;

a calculating unit configured to calculate, during every occurrence of said cycle, a difference between a first information element extracted by the extracting unit and a second information element previously extracted by the extracting unit; and a detecting-scheme performance determining unit configured to determine whether or not to perform a scheme of detecting the communication medium characteristic based on the difference between the first information element and the second information element calculated by the calculating unit.

2. The communication apparatus according to claim 1, wherein the extracting unit extracts a ratio of occurrence of retransmission and an average number of packets not yet transmitted as the information element indicative of the packet transmission efficiency.

3. The communication apparatus according to claim 2, wherein the calculating unit is further operable to calculate a difference in the average number of packets not yet transmitted, and the detecting-scheme performance determining unit is further operable to determine that the detecting scheme is to be performed when the difference in the ratio of occurrence of retransmission is equal to or larger than a predetermined threshold of the difference in the ratio of occurrence of retransmission or the difference in the average number of packets not yet transmitted is larger than a predetermined threshold of the difference in the average number of packets not yet transmitted.

4. The communication apparatus according to claim 3, wherein the detecting-scheme performance determining unit is further operable to determine that the detecting scheme is to be performed when a transmission-speed setting value is smaller than a predetermined threshold of the transmission-speed setting value.

5. The communication apparatus according to claim 1, wherein the extracting unit is further operable to extract an error correction rate as the information element.

6. The communication apparatus according to claim 5, wherein the calculating unit is further operable to calculate a difference in the error correction rate, and the detecting-scheme performance determining unit is further operable to determine that the detecting-scheme is to be performed when the difference in the error correction rate is equal to or larger than a predetermined threshold of the difference in the error correction rate.

7. The communication apparatus according to claim 1, wherein the extracting unit is further operable to extract the information element based on characteristic information indicative of the packet reception quality contained in an ACK packet returned from a communication terminal at a side of receiving the packet.

8. The communication apparatus according to claim 7, wherein the characteristic information is information indicative of a size of a portion requiring error correction.

9. The communication apparatus according to claim 8, wherein the extracting unit is operable to extract an error correction rate indicative of the packet reception quality as the information element based on the size.

10. The communication apparatus according to claim 9, wherein the calculating unit is operable to calculate a difference in the error correction rate, and the detecting-scheme performance determining unit is further operable to determine that the detecting-scheme is to be performed when the difference in the error correction rate is equal to or larger than a predetermined threshold of the difference in the error correction rate.

11. The communication apparatus according to claim 7, wherein the packet contains a simple evaluation series having a predetermined pattern for evaluating the reception quality, data of the simple evaluation series is smaller in size than data of an evaluation series which is used when the detecting scheme is performed for evaluating the communication-medium characteristic, and the characteristic information is any one of a Carrier to Interference and Noise power Ratio (CINR) value, a Signal to Interference and Noise power Ratio (SINR) value, and a reception signal intensity calculated based on the data of the simple evaluation series contained in the packet received by the communication terminal at the receiving side.

12. The communication apparatus according to claim 11, wherein the extracting unit is operable to extract any one of an average value of a plurality of said CINR values, an average value of a plurality of said SINR values, and an average value of a plurality of said reception signal intensities as the information element indicative of the packet reception quality of the received packet.

13. The communication apparatus according to claim 12, wherein the calculating means calculates unit is operable to calculate any one of a difference in the average value of the CINR values, a difference in the average value of the SINR values, and a difference in the average value of the reception signal intensities, and the detecting-scheme performance determining unit is operable to determine that the detecting scheme is to be performed when any calculated one of the difference in the average value of the CINR values, the difference in the average value of the SINR values, and the difference in the average value of the reception signal intensities is equal to or larger than a predetermined threshold.

14. The communication apparatus according to claim 1, wherein the detecting scheme is performed with each occurrence of a predetermined basic cycle, and the predetermined cycle is shorter than the predetermined basic cycle.

15. The communication apparatus according to claim 1, wherein the predetermined cycle is variable.

16. The communication apparatus according to claim 1, further comprising a detecting-scheme performing unit configured to transmit an evaluation-series packet for evaluating the communication-medium characteristic to a communication terminal at a receiving side when the detecting-scheme performance determining unit determines that the detecting scheme is to be performed, receive an evaluation-result packet including results of evaluation of the communication-medium characteristic returned from the communication terminal at the receiving side, and change the communication parameter based on the evaluation-result packet.

17. A method of determining timings of performing a scheme of detecting a communication-medium characteristic for determining a communication parameter for use in modulation and demodulation of a packet, comprising:

extracting, during every occurrence of a predetermined cycle, an information element indicative of packet transmission efficiency, wherein said extracting extracts a ratio of occurrence of retransmission as the information element indicative of the packet transmission efficiency;

calculating, during every occurrence of said cycle, a difference between a first information element extracted in said extracting and a second information element previously extracted in said extracting; and determining whether or not to perform a scheme of detecting the communication medium characteristic based on the difference between the first information element and the second information element calculated in said calculating.

18. The method according to claim 17, wherein in said extracting, the information element is extracted based on characteristic information indicative of the packet reception quality contained in an ACK packet returned from a communication terminal at a side of receiving the packet.

19. A communication apparatus for modulating and demodulating a packet based on a communication parameter determined according to a communication-medium characteristic, comprising:

an extracting unit configured to extract, during every occurrence of a predetermined cycle, an information element indicative of packet transmission efficiency, wherein the extracting unit extracts an average number of packets not yet transmitted as the information element indicative of the packet transmission efficiency;

a calculating unit configured to calculate, during every occurrence of said cycle, a difference between a first information element extracted by the extracting unit and a second information element previously extracted by the extracting unit; and a detecting-scheme performance determining unit configured to determine whether or not to perform a scheme of detecting the communication medium characteristic based on the difference between the first information element and the second information element calculated by the calculating unit.

20. A method of determining timings of performing a scheme of detecting a communication-medium characteristic for determining a communication parameter for use in modulation and demodulation of a packet, comprising:

extracting, during every occurrence of a predetermined cycle, an information element indicative of packet transmission efficiency, wherein said extracting extracts an average number of packets not yet transmitted as the information element indicative of the packet transmission efficiency;

calculating, during every occurrence of said cycle, a difference between a first information element extracted in said extracting and a second information element previously extracted in said extracting; and determining whether or not to perform a scheme of detecting the communication medium characteristic based on the difference between the first information element and the second information element calculated in said calculating.

* * * * *

UNITED STATES PATENT AND TRADEMARK OFFICE
CERTIFICATE OF CORRECTION

| | | |
|---|---|---|
| PATENT NO. | : 7,187,657 B2 | Page 1 of 1 |
| APPLICATION NO. | : 10/959094 | |
| DATED | : March 6, 2007 | |
| INVENTOR(S) | : Youhei Koide et al. | |

It is certified that error appears in the above-identified patent and that said Letters Patent is hereby corrected as shown below:

In column 31, line 61, "calculating means calculates unit" should read --calculating unit--.

Signed and Sealed this

Third Day of July, 2007

JON W. DUDAS
*Director of the United States Patent and Trademark Office*